(12) United States Patent
Im et al.

(10) Patent No.: US 12,363,458 B2
(45) Date of Patent: Jul. 15, 2025

(54) IMAGE SENSOR AND OPERATING METHOD

(71) Applicant: SAMSUNG ELECTRONICS CO., LTD., Suwon-si (KR)

(72) Inventors: Gyubeom Edward Im, Suwon-si (KR); Yohan Roh, Suwon-si (KR); Youngil Seo, Suwon-si (KR); Hansol Lee, Suwon-si (KR); Kyeongjong Lim, Suwon-si (KR); Jeyeon Kim, Suwon-si (KR); Yeolmin Seong, Suwon-si (KR); Yongjoon Song, Suwon-si (KR); Jeisung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 125 days.

(21) Appl. No.: 18/385,188

(22) Filed: Oct. 30, 2023

(65) Prior Publication Data

US 2024/0147090 A1 May 2, 2024

(30) Foreign Application Priority Data

Oct. 31, 2022 (KR) .................... 10-2022-0142604

(51) Int. Cl.
*H04N 25/683* (2023.01)
*G06T 3/60* (2006.01)
*H04N 25/78* (2023.01)

(52) U.S. Cl.
CPC ............ *H04N 25/683* (2023.01); *G06T 3/60* (2013.01); *H04N 25/78* (2023.01)

(58) Field of Classification Search
CPC ...... H04N 25/683; H04N 25/78; H04N 25/00; H04N 25/134; H04N 25/68; H04N 25/75; G06T 3/60; G06N 3/045; G06N 3/08; H10F 39/802

See application file for complete search history.

(56) References Cited

U.S. PATENT DOCUMENTS

| | | | |
|---|---|---|---|
| 8,208,044 B2 * | 6/2012 | Atanassov | H04N 25/683 348/241 |
| 9,967,481 B2 | 5/2018 | Litvinov | |
| 10,091,439 B2 * | 10/2018 | Högasten | H10F 39/8063 |
| 11,080,835 B2 | 8/2021 | Doggett et al. | |
| 11,210,774 B2 | 12/2021 | Schroers et al. | |
| 2006/0177126 A1 * | 8/2006 | Han | G06T 5/20 382/254 |
| 2021/0243395 A1 * | 8/2021 | Saito | H04N 25/70 |
| 2022/0005168 A1 * | 1/2022 | Kim | G06T 7/001 |
| 2022/0036533 A1 | 2/2022 | Xiao et al. | |
| 2022/0207680 A1 | 6/2022 | Wang et al. | |
| 2022/0327664 A1 * | 10/2022 | Patil | G06T 11/008 |

* cited by examiner

Primary Examiner — Nhan T Tran
(74) Attorney, Agent, or Firm — Sughrue Mion, PLLC

(57) ABSTRACT

An image sensor includes: a pixel array including a plurality of sensing pixels each configured to convert a received light signal into an electrical signal; a readout circuit configured to convert the electrical signals into image data and output the image data; and a bad pixel correction circuit configured to: input, to a neural network, first input data comprising a first cluster bad pixel of the image data in a first direction to generate a first corrected pixel data, and flip second input data comprising a second cluster bad pixel of the image data in a second direction to generate third input data, and input, to the neural network, the third input data to generate a second corrected pixel data.

20 Claims, 21 Drawing Sheets

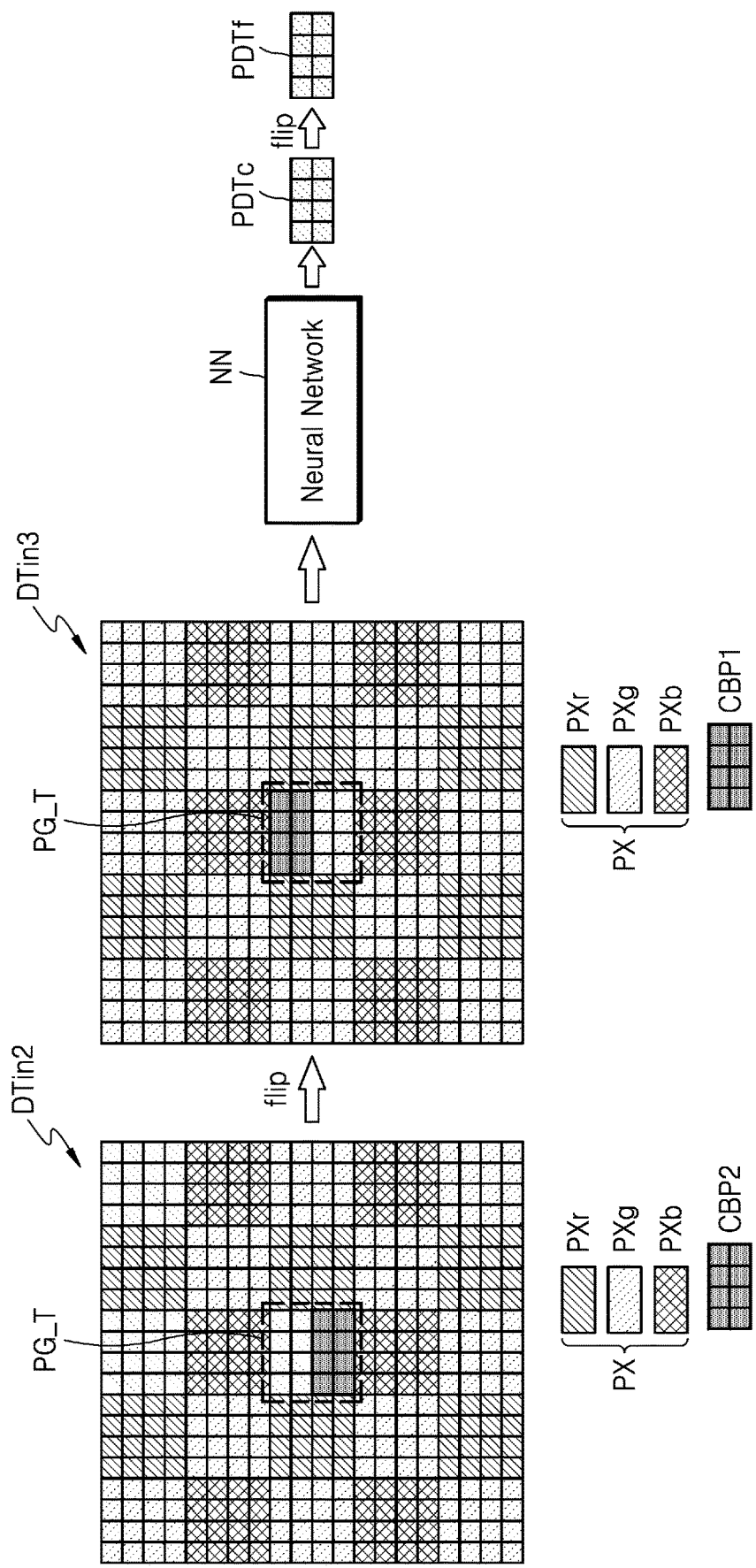

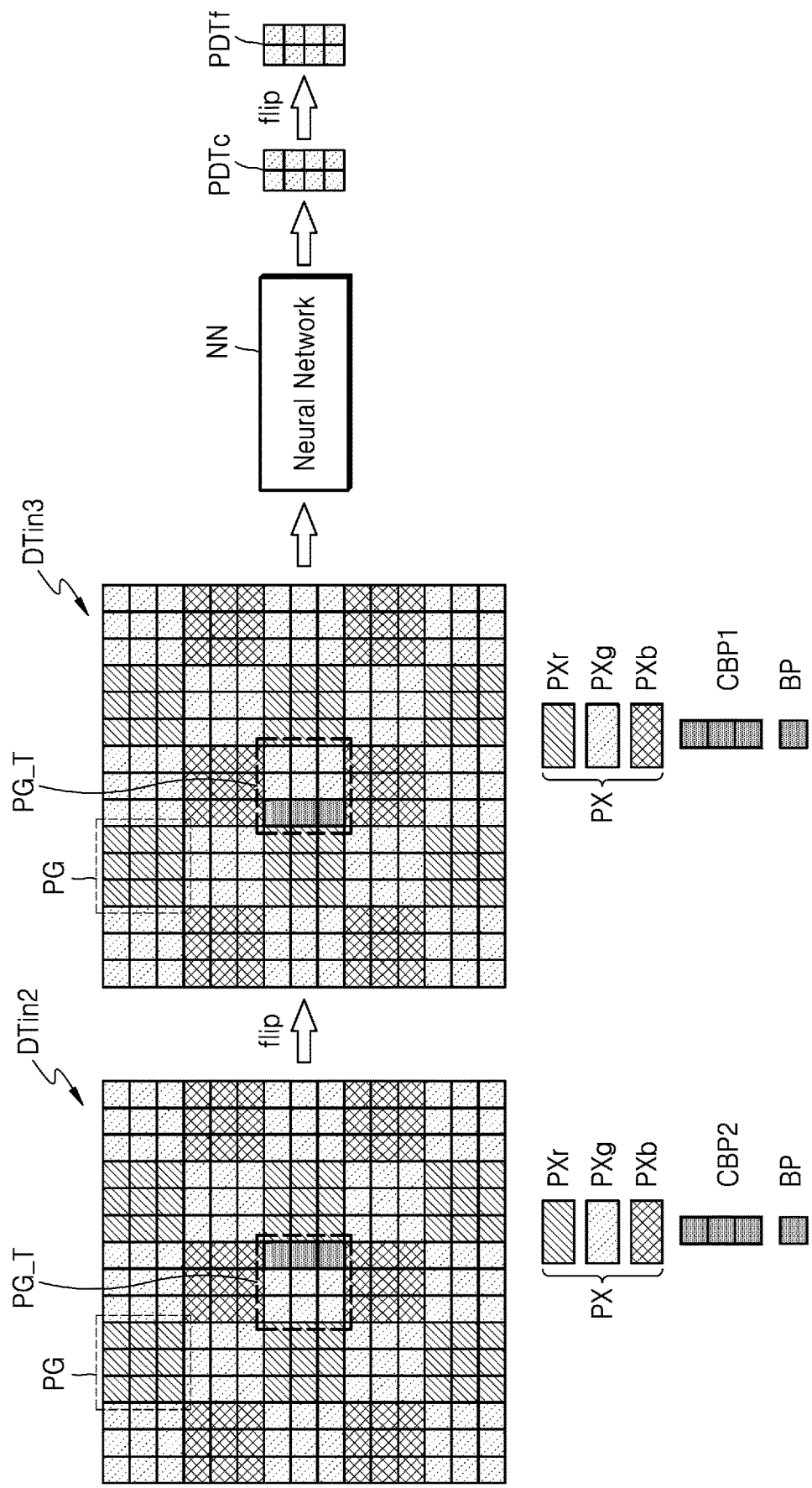

IMAGE SENSOR AND OPERATING METHOD

CROSS-REFERENCE TO RELATED APPLICATION

This application is based on and claims priority under 35 U.S.C. § 119 to Korean Patent Application No. 10-2022-0142604, filed on Oct. 31, 2022, in the Korean Intellectual Property Office, the disclosure of which is incorporated by reference herein in its entirety.

BACKGROUND

The disclosure relates to an image sensor, and more particularly, to an image sensor and an operating method thereof to correct a cluster bad pixel based on artificial intelligence (e.g., deep learning).

Recently, as the demands for photographs and videos having high quality and high image quality have increased, a number of sensing pixels are integrated into a pixel array so as to increase a resolution of image sensors, and thus, sensing pixels are miniaturized. Because a cluster bad pixel occurs frequently at a fixed position of a pixel array due to a process issue, a technology for correcting cluster bad pixels is needed.

Artificial intelligence (e.g., deep learning) technology extracts valid information from input data by using a trained neural network. The artificial intelligence (e.g., deep learning) technology may be used to correct cluster bad pixels, but has difficulties in real-time processing due to an excessive number of arithmetic operations.

SUMMARY

Provided are an image sensor and an operating method thereof to correct a cluster bad pixel in real time based on artificial intelligence (e.g., deep learning).

According to an aspect of the disclosure, an image sensor includes: a pixel array including a plurality of sensing pixels each configured to convert a received light signal into an electrical signal; a readout circuit configured to convert the electrical signals into image data and output the image data; and a bad pixel correction circuit configured to: input, to a neural network, first input data comprising a first cluster bad pixel of the image data in a first direction to generate a first corrected pixel data, and flip second input data comprising a second cluster bad pixel of the image data in a second direction to generate third input data, and input, to the neural network, the third input data to generate a second corrected pixel data.

According to another aspect of the disclosure, an image sensor includes: a pixel array including a plurality of pixels each configured to convert a received light signal into an electrical signal; a readout circuit configured to convert the electrical signals into image data and output the image data, the image data each including a plurality of pixel groups each including pixels of same color arranged in an N×N matrix; and an image signal processor configured to: generate input data including a target pixel group including a cluster bad pixel, input the input data to a neural network in a first case that the cluster bad pixel is arranged at a left portion in the target pixel group, flip the input data horizontally in a second case that the cluster bad pixel is arranged at a right portion in the target pixel group, and input the flipped input data to the neural network. N is an integer of 2 or more.

According to another aspect of the disclosure, a method performed by an image sensor, includes: generating image data, based on a light signal received by the image sensor; detecting a cluster bad pixel in the image data; generating input data including a target pixel group including the cluster bad pixel and peripheral pixel groups arranged at a periphery of the target pixel group; in a case that the cluster bad pixel includes a second cluster bad pixel including pixels arranged in a second direction in the target pixel group, flipping the input data to generate flipped input data; and performing bad pixel correction processing on the input data or the flipped input data, based on a neural network trained to correct a first cluster bad pixel symmetrical with the second cluster bad pixel.

BRIEF DESCRIPTION OF DRAWINGS

The above and other aspects, features, and advantages of certain embodiments of the disclosure will be more apparent from the following description taken in conjunction with the accompanying drawings, in which:

FIGS. 8A and 8B illustrate an operation of a bad pixel corrector according to an embodiment;

FIGS. 9A and 9B illustrate an operation of a bad pixel corrector according to an embodiment;

DETAILED DESCRIPTION OF EMBODIMENTS

Hereinafter, various embodiments will be described in detail with reference to the accompanying drawings. The embodiments described herein are example embodiments, and thus, the disclosure is not limited thereto and may be realized in various other forms.

Figure 1:
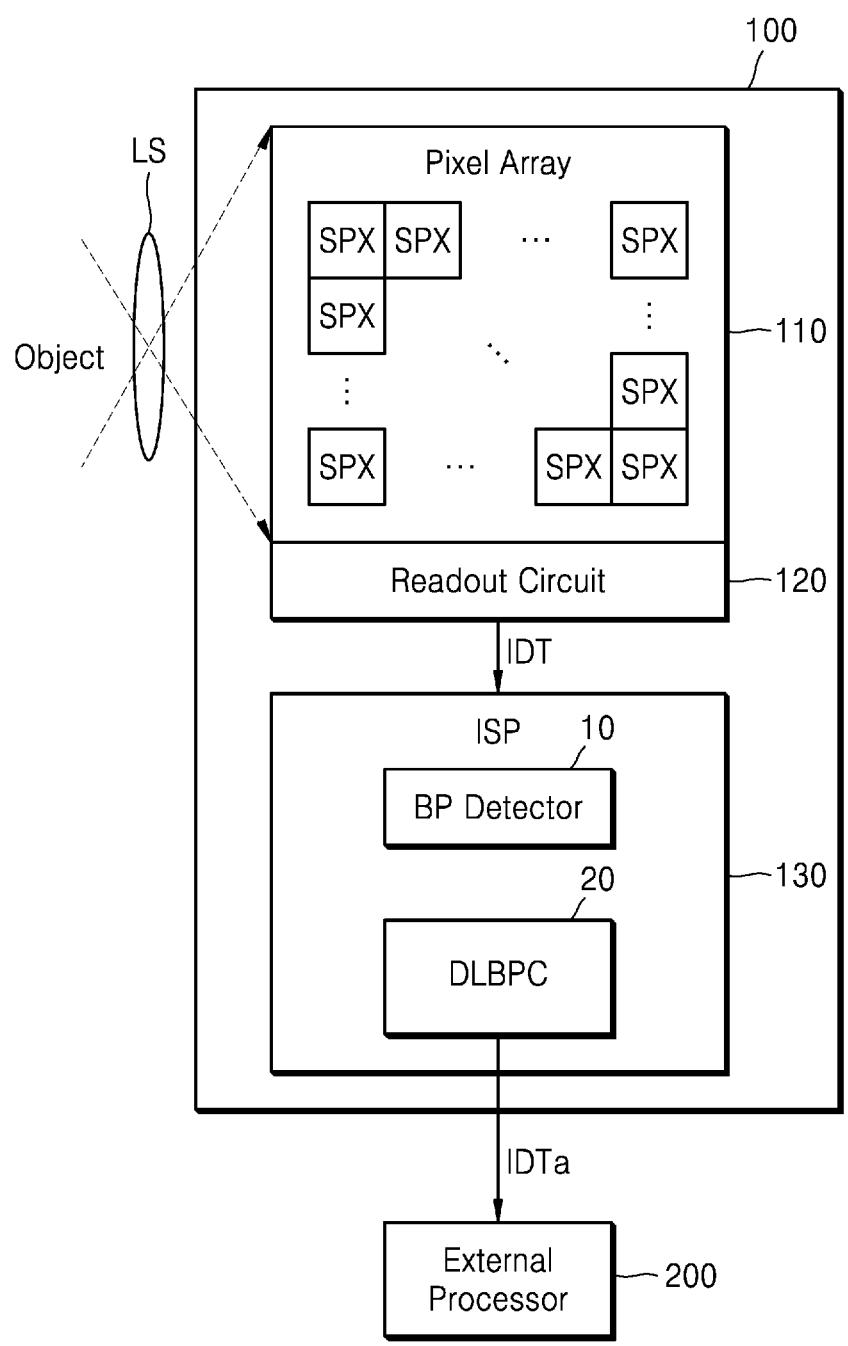
FIG. 1 is a block diagram illustrating an image sensor according to an embodiment.

FIG. 1 is a block diagram illustrating an image sensor 100 according to an embodiment. The image sensor 100 may convert an optical signal of an object, which is incident through an optical lens LS, into image data. The image sensor 100 may be equipped in an electronic device having an image or light sensing function. For example, the image sensor 100 may be equipped in electronic devices such as digital still cameras, digital video cameras, smartphones, wearable devices, Internet of things (IoT) devices, tablet personal computers (PCs), personal digital assistants (PDAs), portable multimedia players (PMPs), and navigation devices. Also, the image sensor 100 may be equipped in electronic devices provided as parts in vehicles, furniture, manufacturing facilities, doors, and various measurement equipment.

Referring to FIG. 1, the image sensor 100 may include a pixel array 110, a readout circuit 120, and an image signal processor (ISP) 130. The image signal processor 130 may include a bad pixel (BP) detector (or referred to as a bad pixel detection circuit) 10 and a bad pixel corrector 20 (or referred to as a bad pixel correction circuit). In one embodiment, the bad pixel corrector 20 may be deep learning-based.

In an embodiment, the pixel array 110, the readout circuit 120, and the ISP 130 may be implemented as one semiconductor chip or semiconductor module. In an embodiment, the pixel array 110 and the readout circuit 120 may be implemented as one semiconductor chip, and the ISP 130 may be implemented as another semiconductor chip.

The pixel array 110 may be implemented as, for example, a photoelectric conversion device such as a charge coupled device (CCD) or a complementary metal oxide semiconductor (CMOS) The pixel array 110 may be implemented as various kinds of photoelectric conversion devices. The pixel array 110 may include a plurality of (sensing) pixels which convert a received light signal (light) into an electrical signal, and the plurality of (sensing) pixels SPX may be arranged in a matrix form. The plurality of (sensing) pixels SPX may each include a photo sensing device. For example, the photo sensing device may include a photodiode, a photo transistor, a photo gate, or pinned photodiode.

A color filter array may be disposed on the pixel array 110. The color filter array may be an array of color filters which are respectively provided on the plurality of sensing pixels SPX so as to capture color information. A color band (for example, a frequency band), which is sensed from a received light signal by using a sensing pixel, may be determined based on a color of a color filter corresponding to the sensing pixel SPX. For example, a green color filter may be disposed on a red sensing pixel which senses a signal of a frequency band of a red color from a received light signal. The color filter array may have various color patterns. This will be described below with reference to FIGS. 2A and 2B.

Figure 2A:
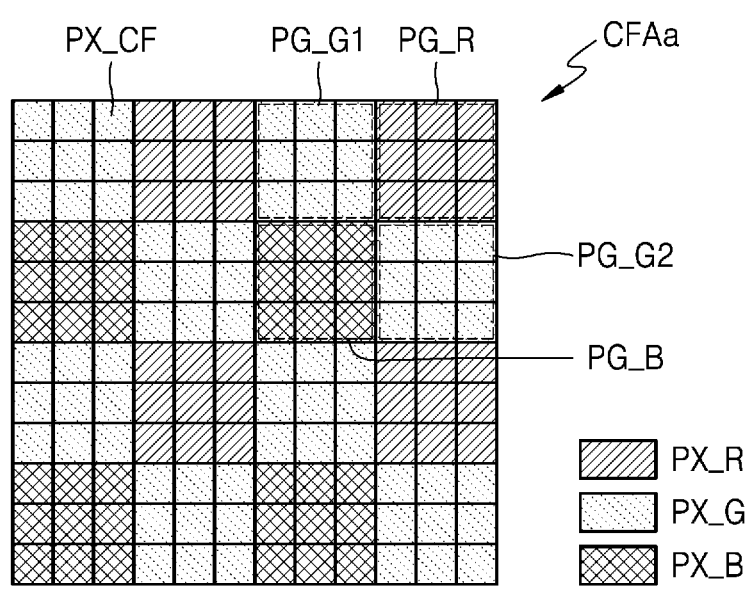
FIGS. 2A and 2B illustrate implementation examples of a color filter array applied to an image sensor according to an embodiment.
Figure 2B:
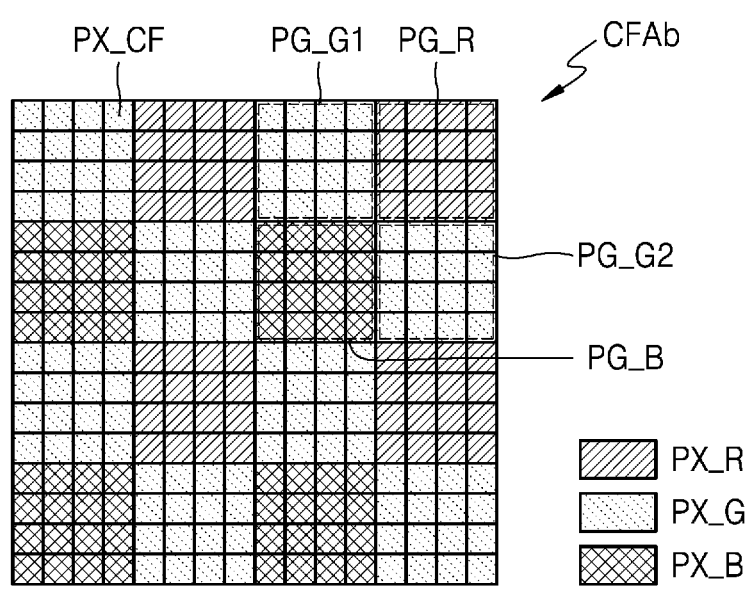

FIGS. 2A and 2B illustrate implementation examples of a color filter array CFAa applied to an image sensor according to an embodiment.

Referring to FIGS. 2A and 2B, the color filter array CFAa may include a super Bayer pattern. A Bayer pattern may denote a pattern where a red pixel (PX_R), a green pixel (PX_G), and a blue pixel (PX_B) are alternately arranged so that a green color is 50% and each of a red color and a blue color is 25%, based on a visual characteristic of a person which is the most sensitive to the green color. The super Bayer pattern may include a red pixel group (PG_R), a blue pixel group (PG_B), a first green pixel group (PG_G1), and a second green pixel group (PG_G2) each including the same color pixels based on the arrangement of a Bayer pattern. Here, the first green pixel group (PG_G1) may denote a green pixel group which is arranged in the same column as the red pixel group (PG_R), and the second green pixel group (PG_G2) may denote a green pixel group which is arranged in the same column as the blue pixel group (PG_B).

Referring to FIG. 2A, each of a red pixel group (PG_R), a blue pixel group (PG_B), a first green pixel group (PG_G1), and a second green pixel group (PG_G2) may include pixels PX_CF of 3 rows, 3 columns (hereinafter referred to as a 3×3 matrix). Nine red pixels PX_R arranged in a 3×3 matrix may be arranged to be diagonal with respect to nine blue pixels PX_B arranged in a 3×3 matrix. Also, nine green pixels PX_G arranged in a 3×3 matrix may be arranged to be diagonal with respect to nine other green pixels PX_G arranged in a 3×3 matrix.

Referring to FIG. 2B, each of a red pixel group (PG_R), a blue pixel group (PG_B), a first green pixel group (PG_G1), and a second green pixel group (PG_G2) may include sixteen pixels PX_CF arranged in a 4×4 matrix. Sixteen red pixels PX_R arranged in a 4×4 matrix may be arranged to be diagonal with respect to sixteen blue pixels PX_B arranged in a 4×4 matrix. Also, sixteen green pixels PX_G arranged in a 4×4 matrix may be arranged to be diagonal with respect to sixteen other green pixels PX_G arranged in a 4×4matrix.

The super Bayer pattern has been described above with reference to FIGS. 2A and 2B. In FIGS. 2A and 2B, it has been described that each of the red pixel group (PG_R), the blue pixel group (PG_B), the first green pixel group (PG_G1), and the second green pixel group (PG_G2) includes the same color pixel PX_CF arranged in a 3×3 matrix, or includes the same color pixel PX_CF arranged in a 4×4 matrix. However, the disclosure is not limited thereto, and in various super Bayer patterns, a pixel group may include the same color pixels PX_CF arranged as N×N pixels (where N is an integer of 2 or more). Also, in an embodiment, a combination of red, blue, and green colors of the color filter array CFAa may be changed to a combination of other colors. For example, red, blue, and green may be replaced with cyan, magenta, and yellow.

Referring again to FIG. 1, the readout circuit 120 may convert electrical signals, received from the pixel array 110, into image data IDT. The readout circuit 120 may amplify the electrical signals and may analog-digital convert the amplified electrical signals. The image data IDT generated by the readout circuit 120 may include pixel values respectively corresponding to sensing pixels SPX of the pixel array 110. The readout circuit 120 and the pixel array 110 may be referred to as a sensing core.

The ISP 130 may perform image processing on the image data IDT output from the readout circuit 120. The ISP 130 may perform bad pixel correction on the image data IDT. Furthermore, the ISP 130 may perform image processing such as noise removal, remosaic, and binning on the image data IDT.

The bad pixel detector 10 may detect a bad pixel from the image data IDT and may detect a type of the bad pixel. A static bad pixel occurring at a fixed position (i.e., a certain position) of the image data IDT or a dynamic bad pixel randomly occurring in the image data IDT may be detected. The static bad pixel may include a cluster bad pixel which is generated by configuring a cluster with a plurality of adjacent bad pixels. Here, a plurality of bad pixels included in the cluster bad pixel may correspond to the same color.

The bad pixel corrector 20 may correct the cluster bad pixel, based on deep learning. The bad pixel corrector 20 may be referred to as a bad pixel corrector (DLBPC). In one example, the DLBPC may be deep learning based.

In an embodiment, the bad pixel corrector 20 may be implemented with hardware. However, the disclosure is not limited thereto, and the bad pixel corrector 20 may be implemented with software or a combination of hardware and software.

Figure 3:
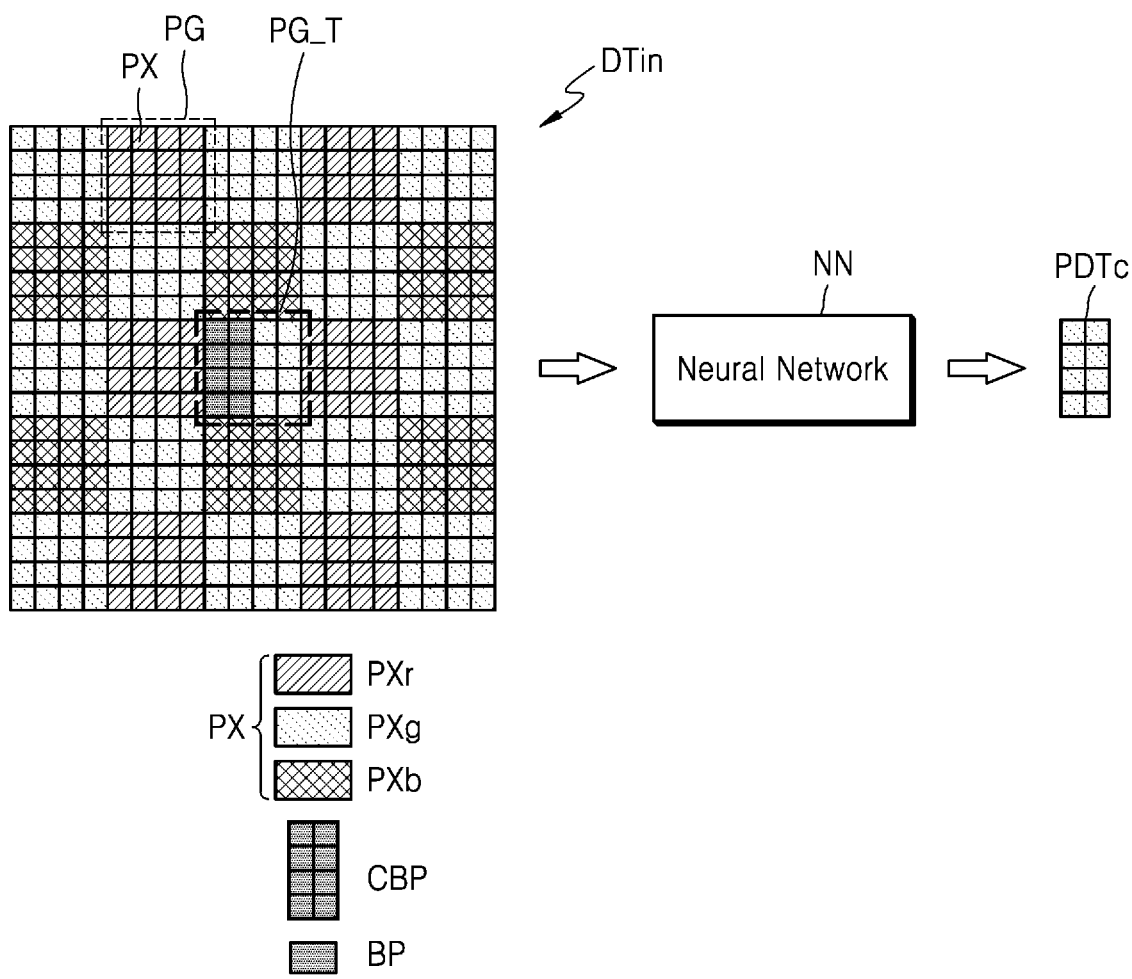
FIG. 3 illustrates an operation of a bad pixel corrector included in an image sensor, according to an embodiment.

FIG. 3 illustrates an operation of a bad pixel corrector included in an image sensor, according to an embodiment.

Referring to FIG. 3, a bad pixel corrector (20 of FIG. 1) may include a neural network NN. The neural network NN may include a deep learning model which is trained to correct a cluster bad pixel CBP and may generate corrected pixel data corresponding to the cluster bad pixel CBP, based on input data DTin including the cluster bad pixel CBP.

Image data (e.g., IDT of FIG. 1) may include a super Bayer pattern, and each pixel group PG may include the same color pixels arranged in a 4×4 matrix (for example, red pixels PXr, blue pixels PXb, and green pixels PXg). The bad pixel corrector 20 may generate the input data DTin including the cluster bad pixel CBP and may input the input data DTin to the neural network NN. The input data DTin may include a plurality of pixel groups PG arranged in a matrix. A target pixel group PG_T including the cluster bad pixel CBP may be disposed at a center of the input data DTin. For example, as illustrated in FIG. 3, the input data DTin may include 25 pixel groups PG arranged in a 5×5 matrix. In other words, the input data DTin may include pixels PX arranged in a 20×20 matrix.

The cluster bad pixel CBP may include bad pixels BP arranged in a first direction (or, a first region) (for example, the left) in the target pixel group PG_T. In FIG. 3, the cluster bad pixel CBP is illustrated as including eight bad pixels BP arranged in a 4×2 matrix disposed to the left in the target pixel group PG_T. However, the disclosure is not limited thereto, and the number and positions of bad pixels BP included in the cluster bad pixel CBP may be changed. For example, the cluster bad pixel CBP may include bad pixels BP arranged in a 4×2 matrix disposed to the right in the target pixel group PG_T.

The neural network NN may process the input data DTin to generate corrected pixel data PDTc. The corrected pixel data PDTc may include pixel values respectively corresponding to the bad pixels BP included in the cluster bad pixel CBP. The cluster bad pixel CBP of the target pixel group PG_T in the image data IDT may be replaced with the corrected pixel data PDTc.

In FIG. 3, an example has been described where the pixel group PG includes pixels PX arranged in a 4×4 matrix and the input data DTin includes pixel groups PG arranged in a 5×5 matrix. However, the disclosure is not limited thereto, and the pixel group PG may include N×N pixels (where N is an integer of 2 or more) having the same color and the input data DTin may include 9 or more pixel groups PG or 25 or more pixel groups PG arranged in a matrix.

As described below, the neural network NN may include a deep learning model which is trained to correct a first cluster bad pixel including bad pixels BP arranged in a first direction (for example, to the left or upward) among N×N pixels having the same color. When the first cluster bad pixel is detected in the image data IDT, the bad pixel corrector 20 may input first input data, including the first cluster bad pixel, to the neural network NN to generate corrected pixel data. When a second cluster bad pixel including pixels arranged in a second direction (or, a second region symmetrical with the first region) (for example, to the right or downward) opposite to the first direction is detected, the bad pixel corrector 20 may horizontally flip or vertically flip second input data including the second cluster bad pixel to generate third input data and may input the third input data to the neural network NN to generated corrected pixel data. In an embodiment, each of the first cluster bad pixel and the second cluster bad pixel may include bad pixels BP arranged in an M×K matrix, where M is an integer of 2 or more and less than N, and K is an integer of 1 or more and N or less, and a first M×K matrix corresponding to the first cluster bad pixel and a second M×K matrix corresponding to the second cluster bad pixel may be disposed at symmetrical positions in the target pixel group PG_T.

In an embodiment, the neural network NN may include a first network corresponding to a green color and a second network corresponding to a non-green color (for example, red color or blue color). For example, the first network may include a first deep learning model which is trained to correct a first cluster bad pixel of a first green channel, based on training data including a first cluster bad pixel in a first green channel, and the second network may include a second deep learning model which is trained to correct a first cluster bad pixel of a red channel, based on training data including a first cluster bad pixel in a red channel. Here, the first green channel may denote pixel groups PG including first green pixels (for example, green pixels PXg arranged in the same column as a red pixel PXr), the second green channel may denote pixel groups PG including second green pixels (for example, green pixels PXg arranged in the same column as a blue pixel PXb), the red channel may denote pixel groups PGr including red pixels PXr, and the blue channel may denote pixel groups PGb including blue pixels PXb.

When a cluster bad pixel CBP occurs in the first green channel or the second green channel, the bad pixel corrector 20 may correct a cluster bad pixel, based on the first network, and when a cluster bad pixel CBP occurs in the red channel or the blue channel, the bad pixel corrector 20 may correct a cluster bad pixel, based on the second network. A configuration and an operation of the bad pixel corrector 20 will be described below in detail.

Image-processed image data IDTa may be provided to an external processor 200 (for example, a main processor or a graphics processor of an electronic device equipped with the image sensor 100). The external processor 200 may perform the image-processed image data IDTa to improve image quality or decrease a resolution of the image data IDTa, or may store the image-processed image data IDTa, display the image-processed image data IDTa by using a display, or provide the image-processed image data IDTa to an element which performs an operation based on the image-processed image data IDTa.

As described above, in the image sensor 100 according to an embodiment, the bad pixel corrector 20 based on deep learning may correct a cluster bad pixel occurring at a fixed position of the image data IDT. The bad pixel corrector 20 may correct the second cluster bad pixel as well as the first cluster bad pixel by using the neural network NN trained to correct the first cluster bad pixel, based on a method of flipping the input data DTin. Also, the bad pixel corrector 20 may correct a cluster bad pixel occurring in each of the first green channel and the second green channel, based on the first network corresponding to the green channel, and may correct a cluster bad pixel occurring in each of the red channel and the blue channel, based on the second network corresponding to the non-green channel.

In a case where the bad pixel corrector 20 separately processes the first cluster bad pixel and the second cluster bad pixel on each of the first green channel, the second green channel, the red channel, and the blue channel, eight deep learning models (for example, eight networks) may be needed, and thus, a size of the neural network NN may be large and there may be an excessive number of arithmetic operations. However, the bad pixel corrector 20 according to an embodiment may flip input data to correct the first cluster bad pixel and the second cluster bad pixel by using one network, and moreover, two networks corresponding to the green channel and the non-green channel may process four colors (for example, the first green channel, the second green channel, the red channel, and the blue channel), thereby decreasing the number of networks included in the neural network NN. Accordingly, the number of arithmetic operations and a size of the neural network NN may be reduced. Therefore, the image sensor 100 may process a cluster bad pixel of the image data IDT in real time, based on the neural network NN which is weight-lightened, and the visibility of a cluster bad pixel may decrease in the image data IDTa (for example, the image data IDTa provided from an external processor) which is output through image processing.

Figure 4:
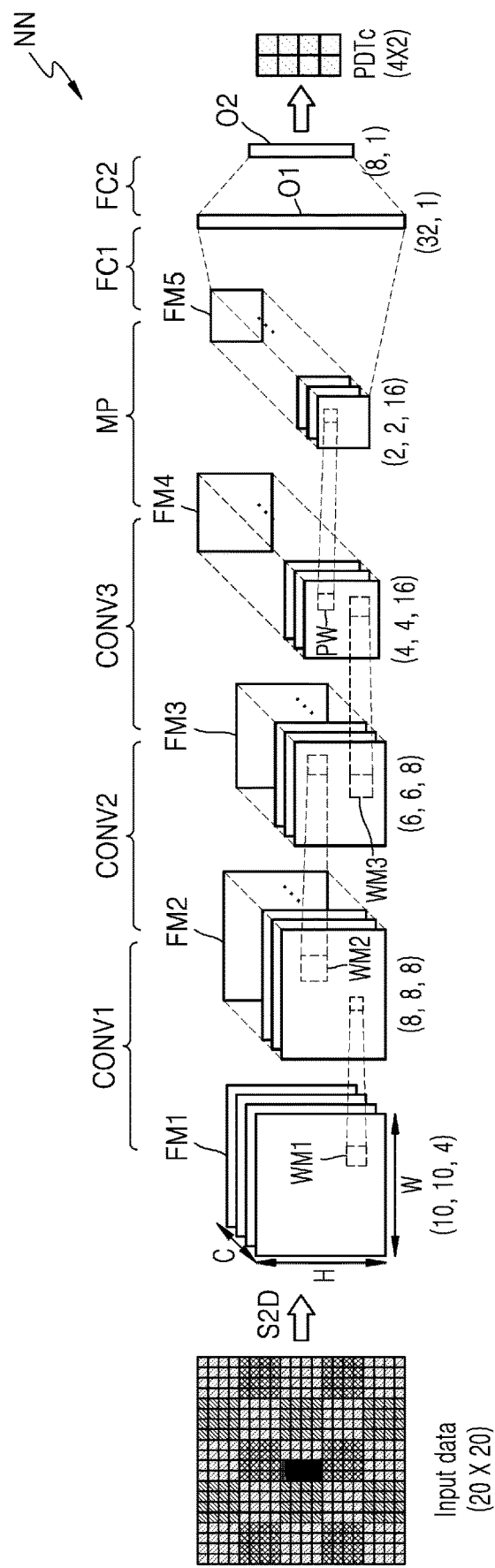
FIG. 4 illustrates an example of a structure of a neural network according to an embodiment.

FIG. 4 illustrates an example of a structure of a neural network NN according to an embodiment.

Referring to FIG. 4, the neural network NN may include first to third convolution layers CONV1 to CONV3, a max pooling layer MP, a first fully connected layer FC1, and a second fully connected layer FC2. As described above, the neural network NN may include a plurality of layers, and the neural network NN having a multi-layered structure may be referred to as a deep neural network (DNN) or a deep learning architecture.

Each of the plurality of layers may receive a feature map and may perform an arithmetic operation on the feature map to generate an output feature map or an output. The output feature map of each layer may be provided as an input feature map of a next layer. The feature map may denote data where various features of input data are expressed, and each of feature maps may have a two-dimensional (2D) matrix or three-dimensional (3D) matrix (or referred to as a tensor) form, which includes a plurality of feature values. The feature maps may have a height H (or a row), a width W (or a column), and a channel number C, and the channel number C may be referred to as a depth.

The input data (for example, pixels PX arranged in a 20×20 matrix) may include bad pixels of a 4×2 matrix (four rows and two columns) (for example, a cluster bad pixel). The input data may be generated as a first feature map FM1 through space to depth (S2D) conversion. Digits (for example, 10, 10, and 4) in parenthesis representing a size of the first feature map FM1 may respectively represent a height (row), a width (column), and a channel number. An input including pixels PX of a 20×20 matrix may be converted into the first feature map FM1 including four channels including features of a 10×10 matrix.

A convolution layer may perform convolution on an input feature map and one or more weight maps to generate an output feature map. For example, the first convolution layer CONV1 may perform convolution on the first feature map FM1 and a first weight map WM1 to generate a second feature map FM2. A weight map (for example, the first weight map WM1) may include a plurality of weights and may have a 2D matrix or 3D matrix form. The weight map may filter the input feature map and may be referred to as a filter or a kernel. The number of channels of the weight map (for example, the first weight map WM1) may be the same as the number of channels of the input feature map (for example, the first weight map WM1), and convolution may be performed on the same channels of the input feature map and the weight map.

The first weight map WM1 may be shifted based on a traversal method using the first feature map FM1 as a sliding window. While each shift is being performed, each of weights included in the first weight map WM1 may be multiplied to all feature values in a region overlapping the first feature map FM1, and results of the multiplication may be added. As convolution is performed on the first feature map FM1 and the first weight map WM1, one channel of the second feature map FM2 may be generated. The number of weight maps may be the same as the number of channels of an output feature map (for example, the second feature map FM2). For example, in the first convolution layer CONV1, convolution may be performed on eight first weight maps WM1 and the first feature map FM1, and thus, the second feature map FM2 including eight channels may be generated. A size (for example, a height, a width, and a channel number) of the second feature map FM2 may respectively be 8, 8, and 8.

The second convolution layer CONV2 may perform convolution on the second feature map FM2 and a weight map (for example, one or more second weight maps WM2) to generate a third feature map FM3, and the third convolution layer CONV3 may perform convolution on the third feature map FM3 and a weight map (for example, one or more third weight maps WM3) to generate a fourth feature map F4. A size (for example, a height, a width, and a channel number) of the third feature map FM3 may respectively be 6, 6, and 8, and a size (for example, a height, a width, and a channel number) of the fourth feature map FM4 may respectively be 4, 4, and 16.

The max pooling layer MP may slide an input feature map (for example, the fourth feature map FM4) by size units of a pooling window PW by using the pooling window PW to select a maximum value from among feature values of a region overlapping the pooling window PW. Accordingly, an output feature map (for example, a fifth feature map FM5) where a spatial size is reduced may be generated. A size (for example, a height, a width, and a channel number) of the fifth feature map FM5 may respectively be 2, 2, and 16.

A fully connected layer (for example, the first fully connected layer FC1) may flatten an input feature map (for example, the fifth feature map FM5) to multiply a one-dimensionally vectorized input by a weight of each class having the same dimension and may apply a result of the multiplication to an activation function to generate an output including one-dimensional (1D) output values. Therefore, the first fully connected layer FC1 may generate a first output O1 including 32 output values (for example, an output value of 32 rows, 1 column), and the second fully connected layer FC2 may generate a second output O2 including 8 output values (for example, an output value of 8 rows, 1 column), based on the first output O1. The second output O2 may be converted into corrected pixel data PDTc having a corrected pixel value of a 4×2 matrix (4 rows, 2 columns).

In FIG. 4, sizes of outputs of each layer (for example, the first to fifth feature maps FM1 to FM5 and the first and second outputs O1 and O2) are illustrated, but the sizes of the outputs of each layer may vary and the number of bad pixels included in a cluster bad pixel may vary also. The number of rows and columns of corrected pixel values included in the corrected pixel data PDTc may be the same as the number of rows and columns of bad pixels included in a cluster bad pixel.

Also, in FIG. 4, the neural network NN is illustrated as including six layers including a convolution layer, a max pooling layer, and a fully connected layer, but this may be merely an embodiment and the number and kinds of layers of the neural network NN may vary. For example, in an operation of designing the neural network NN, the number and kinds of layers may be determined based on the performance and number of operations of the neural network NN.

Figure 5:
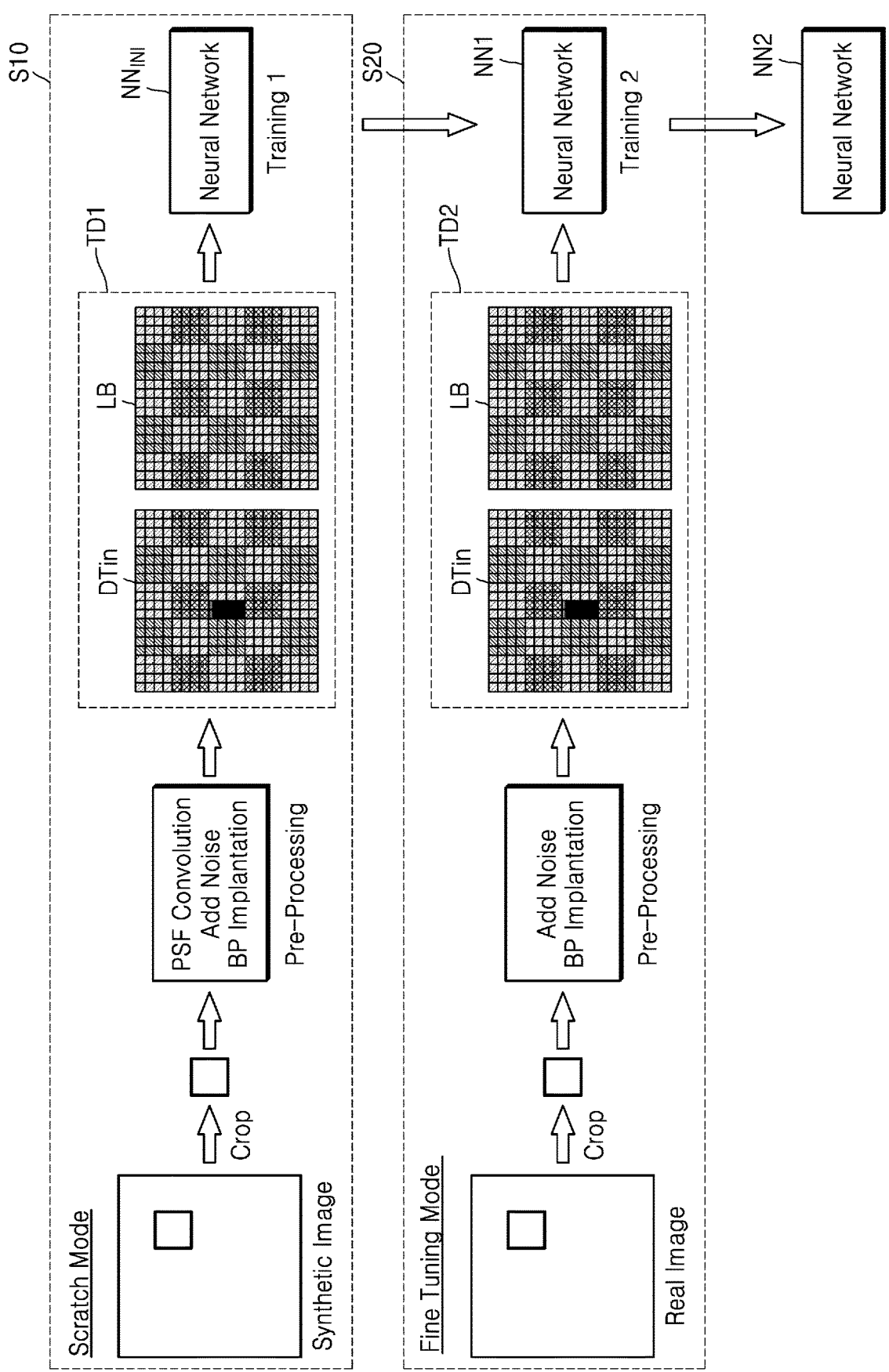
FIG. 5 illustrates a training operation of a neural network according to an embodiment.

FIG. 5 illustrates a training operation of a neural network NN according to an embodiment.

Referring to FIG. 5, a training operation of the neural network NN (or referred to as a training operation) may include a first training operation S10 and a second training operation S20. The first training operation S10 may be referred to as a scratch mode, and the second training operation S20 may be referred to as a fine tuning mode.

In the first training operation S10, first training may be performed on an initial neural network $NN_{INI}$, based on a synthetic image. The initial neural network $NN_{INI}$ may include untrained weights, and for example, may include weights which are set as default values instead of weights determined through training.

A synthetic image including a simple image such as a circle, a triangle, or a tetragon may be prepared, and a portion of the synthetic image may be cropped. Pre-processing may be performed on a cropped image. For example, pre-processing in the first training operation S10 may include point spread function (PSF) convolution, noise addition, and bad pixel (BP) implantation.

Input data DTin including a cluster bad pixel and a label LB including no cluster bad pixel may be generated based on pre-processing. First training data TD1 may include the input data DTin and the label LB, which are generated based on the synthetic image. The first training data TD1 may include a plurality of pairs of input data DTin and labels LB. The initial neural network $NN_{INI}$ may be trained based on the first training data TD1. Accordingly, a first neural network NN1 may be generated. The first neural network NN1 may include a deep learning model which is trained to correct a cluster bad pixel, based on the first training data TD1.

In the second training operation S20, second training may be performed on the first neural network NN1, based on a high-dimensional real image including a complicated shape. The first neural network NN1 may include weights which are trained in the first training operation S10. Here, the accuracy of the weights may not be high. In other words, the performance of the first neural network NN1 may not be high.

A high-dimensional real image may be prepared, and a portion of the real image may be cropped. Pre-processing may be performed on a cropped image. For example, pre-processing in the second training operation S20 may include noise addition and bad pixel (BP) implantation.

Input data DTin including a cluster bad pixel and a label LB including no cluster bad pixel may be generated based on preprocessing. Second training data TD2 may include the input data DTin and the label LB, which are generated based on the real image. The second training data TD2 may include a plurality of pairs of input data DTin and labels LB. The first neural network NN1 may be trained based on the second training data TD2. Accordingly, the second neural network NN2 (for example, a final trained neural network) may be generated. The second neural network NN2 may include a deep learning model which is trained to correct a cluster bad pixel, and the deep learning model may include finely tuned weights. The weights may be trained based on the real image, and the accuracy of the weights may be high. In other words, the performance of the second neural network NN2 may be high. The second neural network NN2 may be applied as the neural network NN of the image sensor (100 of FIG. 1).

Furthermore, training of a neural network described above may be performed by a device (for example, a computing device) to which the neural network NN is applied, in an operation of manufacturing an image sensor, and for example, the computing device may include a processor and a memory. The memory may store training data (for example, the first training data TD1 and the second training data TD2) and weights. The processor may perform an arithmetic operation and verification on the training data, and thus, may train the initial neural network $NN_{INI}$ and the first neural network NN1.

Figure 6A:
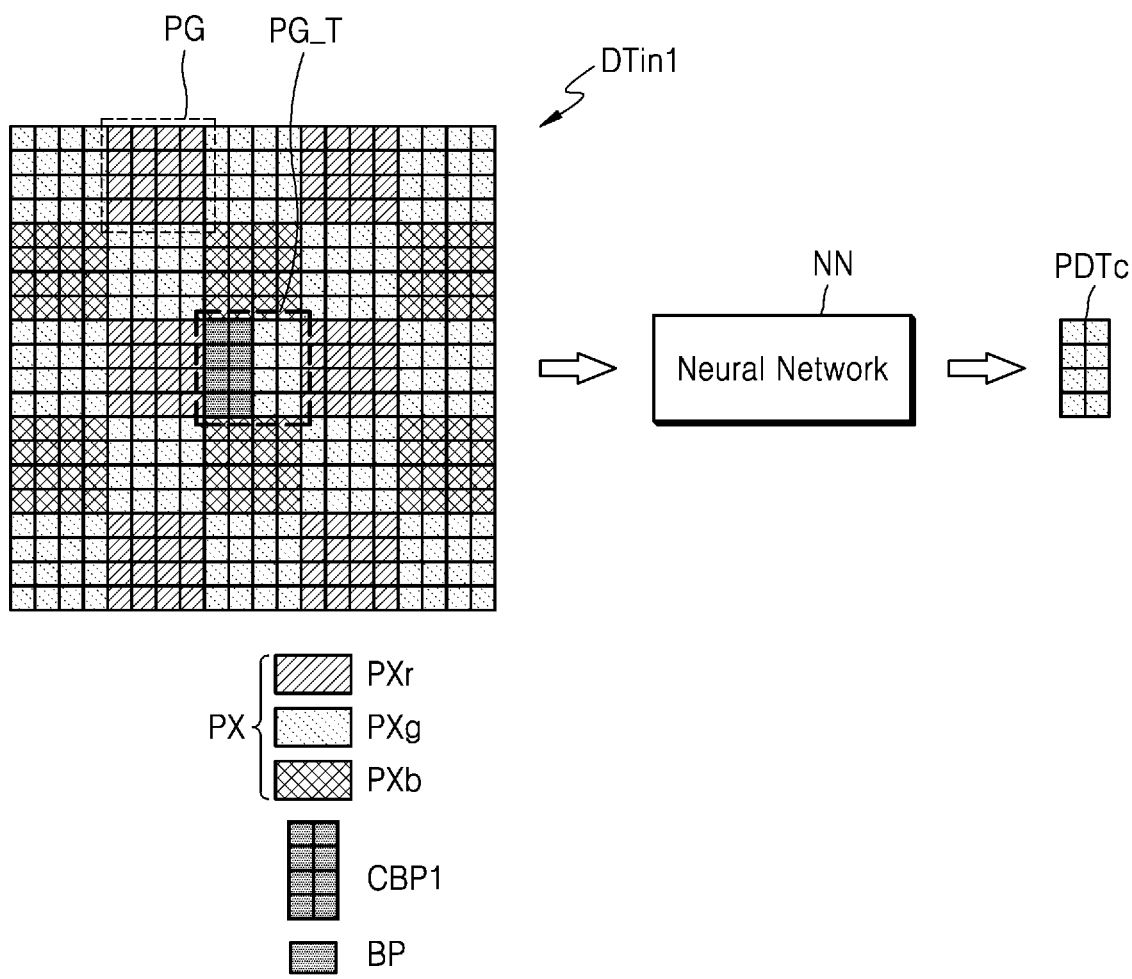
FIGS. 6A and 6B illustrate an operation of a bad pixel corrector according to an embodiment.
Figure 6B:
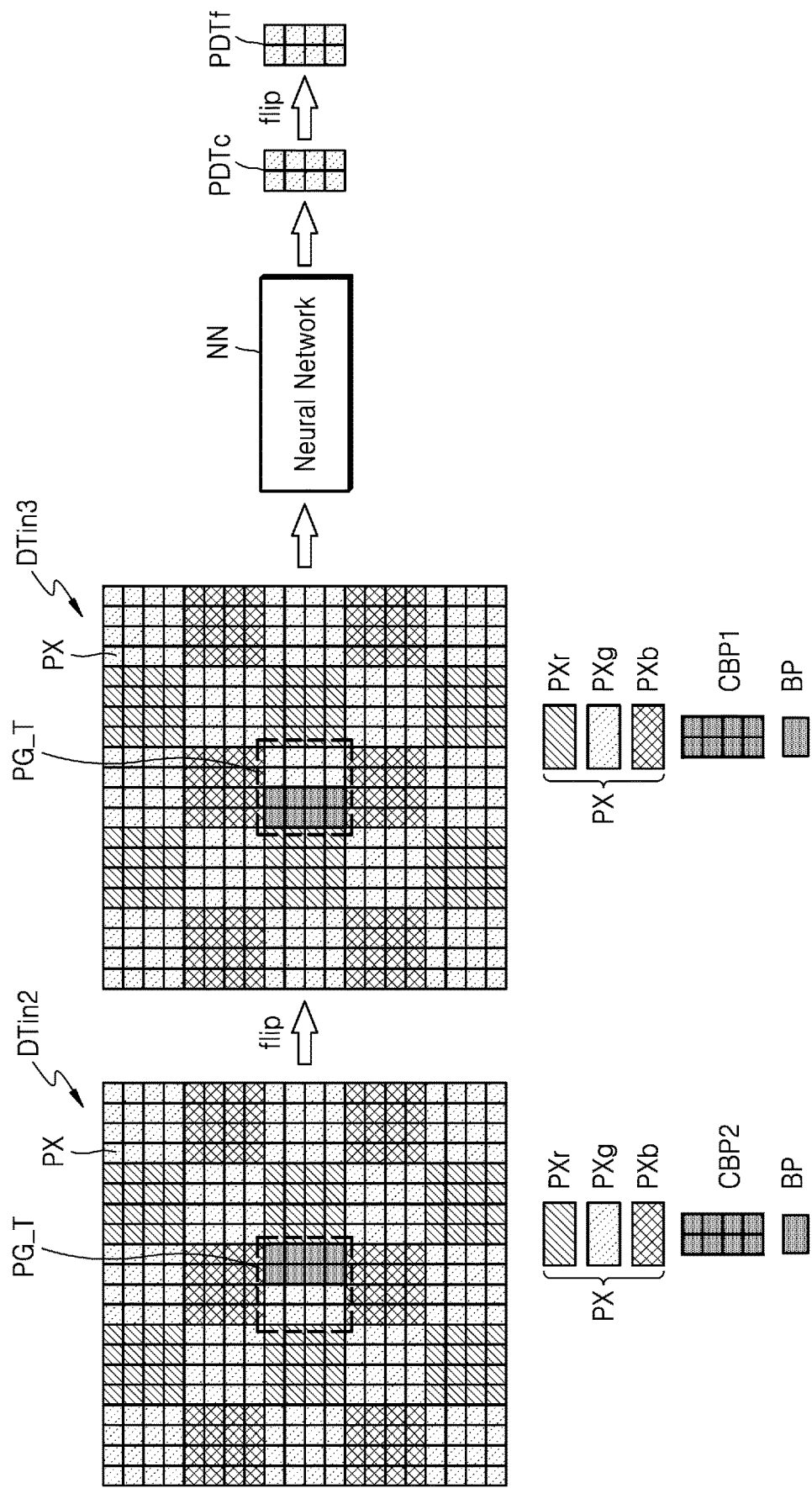

FIGS. 6A and 6B illustrate an operation of a bad pixel corrector according to an embodiment. FIG. 6A illustrates an operation of a bad pixel corrector when input data includes a first cluster bad pixel. FIG. 6B illustrates an operation of a bad pixel corrector when input data includes a second cluster bad pixel.

Referring to FIG. 6A, first input data DTin1 may include a first cluster bad pixel CBP1 including bad pixels BP arranged in a first direction (for example, to the left) in a target pixel group PG_T.

A neural network NN may include a deep learning model which is trained to correct the first cluster bad pixel CBP1. The first input data DTin1 may be input to the neural network NN, and the neural network NN may process the first input data DTin1 to generate corrected pixel data PDTc.

The corrected pixel data PDTc may include pixel values respectively corresponding to bad pixels BP included in the first cluster bad pixel CBP1. The corrected pixel data PDTc may replace the first cluster bad pixel CBP1 in the target pixel group PG_T.

Referring to FIG. 6B, second input data DTin2 may include a second cluster bad pixel CBP2 including bad pixels BP arranged in a second direction (for example, to the right) in a target pixel group PG_T.

A neural network NN may include a deep learning model which is trained to correct the first cluster bad pixel CBP1, and thus, when the second input data DTin2 is input to the neural network NN, accurate corrected pixel data PDTc may not be generated.

The bad pixel corrector 20 may horizontally flip the second input data DTin2 including the second cluster bad pixel CBP2 to generate third input data DTin3. As illustrated, the third input data DTin3 may include a first cluster bad pixel CBP1 in the target pixel group PG_T.

The third input data DTin3 may be input to the neural network NN, and the neural network NN may process the third input data DTin3 to generate corrected pixel data PDTc. Furthermore, the corrected pixel data PDTc may be generated based on the third input data DTin3, and thus, may correspond to the first cluster bad pixel CBP1 of the third input data DTin3.

The bad pixel corrector 20 may horizontally flip the corrected pixel data PDTc to generate flipped pixel data PDTf. The flipped pixel data PDTf may correspond to the second cluster bad pixel CBP2. Corrected pixel values included in the flipped pixel data PDTf may be applied as pixel values of the bad pixels BP included in the second cluster bad pixel CBP2.

Figure 7:
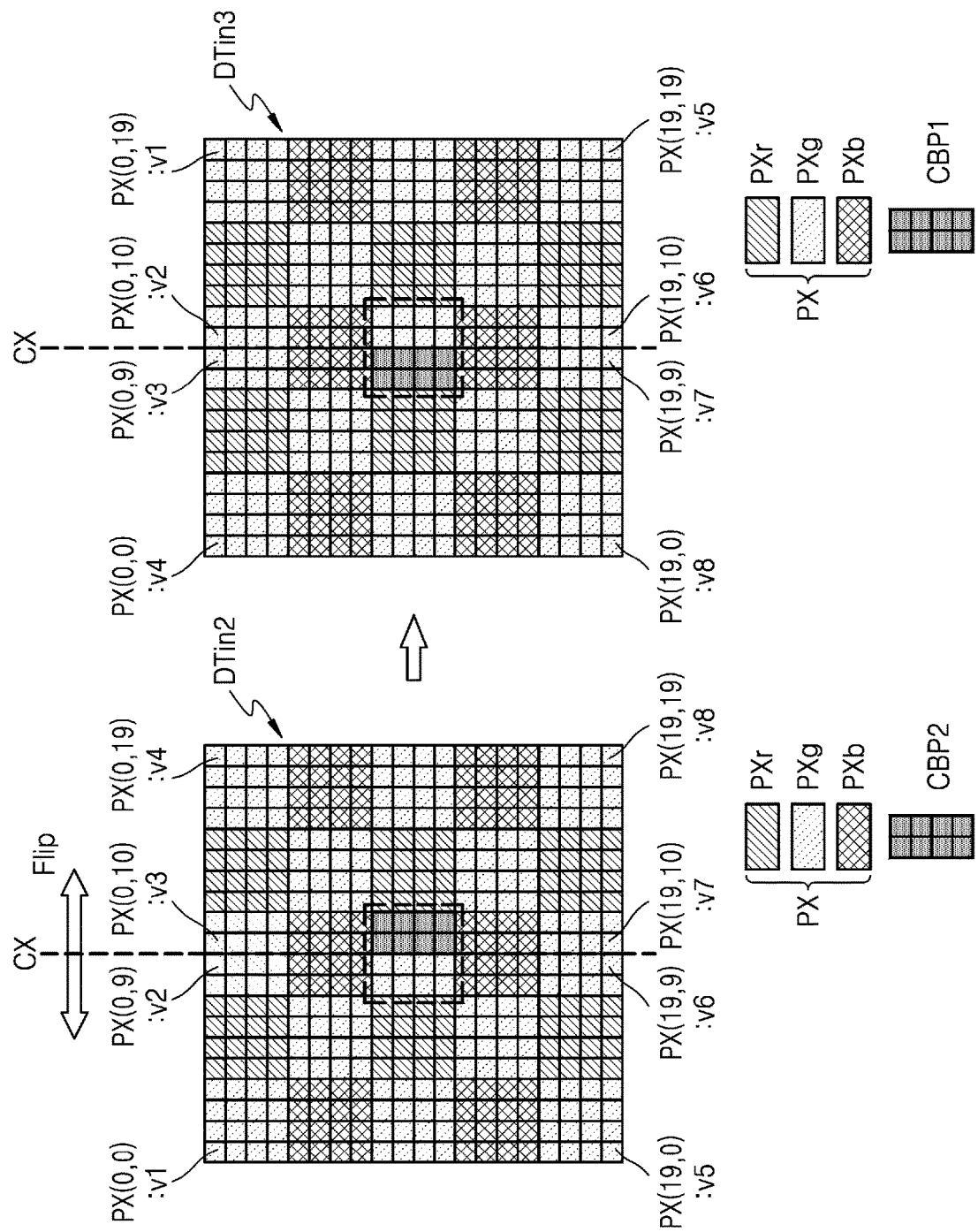
FIG. 7 illustrates an operation of flipping input data in a bad pixel corrector according to an embodiment.

FIG. 7 illustrates in detail an operation of flipping input data in a bad pixel corrector according to an embodiment.

Referring to FIG. 7, second input data DTin2 may include a second cluster bad pixel CBP2. The second input data DTin2 may be horizontally flipped with respect to a center axis CX. As a result, third input data DTin3 generated by horizontally flipping the second input data DTin2 may include a first cluster bad pixel CBP1. An index representing a position of a pixel PX (for example, values in parenthesis) may be maintained. A fore index of indexes in parenthesis may represent a row, and a latter index thereof may represent a column. For example, PX(0,10) may represent a pixel PX arranged in 0th row, 10th column.

For example, in the second input data DTin2, a pixel value v1 of PX(0,0), a pixel value v2 of PX(0,9), a pixel value v3 of PX(0,10), and a pixel value v4 of PX(0,19) may be respectively applied as pixel values of PX(0,19), PX(0,10), PX(0,9), and PX(0,0) in the third input data DTin3. In the second input data DTin2, a pixel value v5 of PX(19,0), a pixel value v6 of PX(19,9), a pixel value v7 of PX(19,10), and a pixel value v8 of PX(19,19) may be respectively applied as pixel values of PX(19,19), PX(19,10), PX(19,9), and PX(19,0) in the third input data DTin3.

Figure 8A:
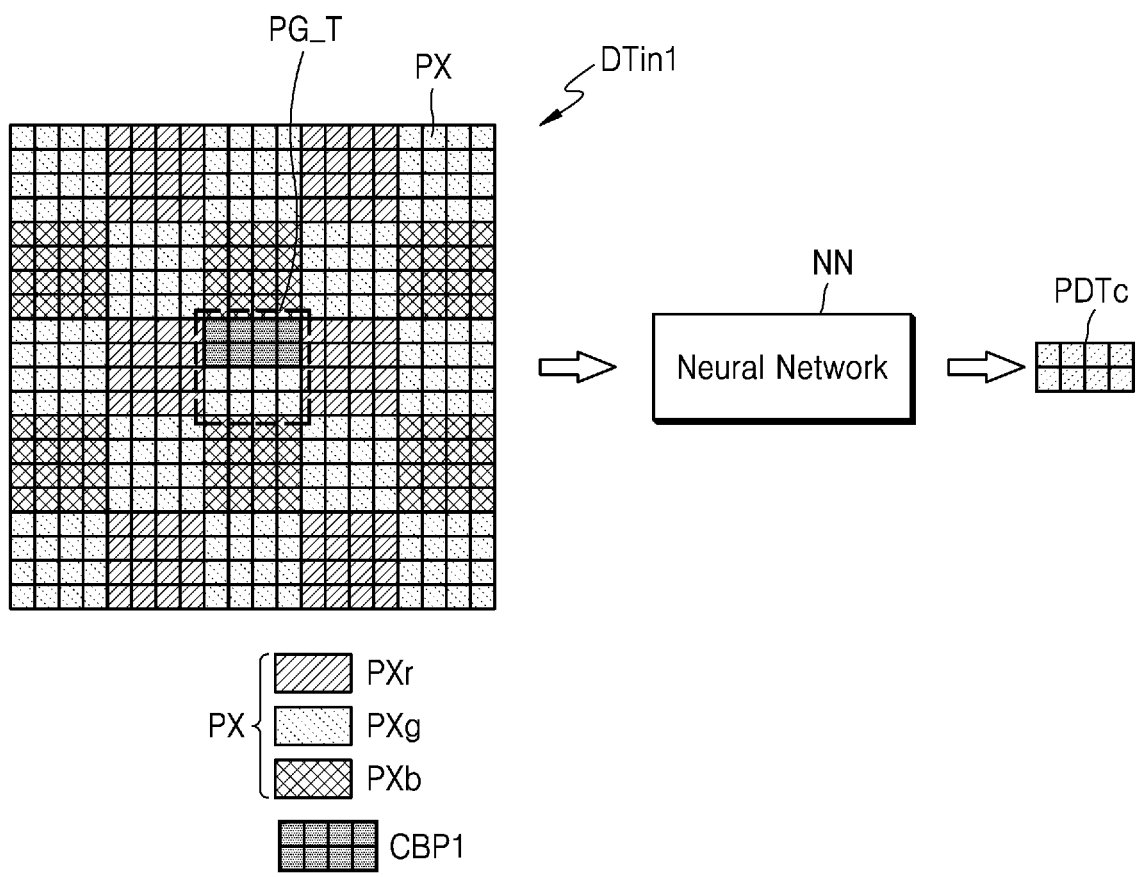

FIGS. 8A and 8B illustrate an operation of a bad pixel corrector according to an embodiment. FIG. 8A illustrates an operation of a bad pixel corrector when input data includes a first cluster bad pixel CBP1. FIG. 8B illustrates an operation of a bad pixel corrector when input data includes a second cluster bad pixel CBP2.

Referring to FIG. 8A, first input data DTin1 may include a first cluster bad pixel CBP1 including bad pixels BP arranged in a first direction (or, a first region) (for example, upward) in a target pixel group PG_T.

A neural network NN may include a deep learning model which is trained to correct the first cluster bad pixel CBP1. The first input data DTin1 may be input to the neural network NN, and the neural network NN may process the first input data DTin1 to generate corrected pixel data PDTc.

The corrected pixel data PDTc may include pixel values respectively corresponding to bad pixels BP included in the first cluster bad pixel CBP1. The corrected pixel data PDTc may replace the first cluster bad pixel CBP1 in the target pixel group PG_T.

Referring to FIG. 8B, second input data DTin2 may include a second cluster bad pixel CBP2 including bad pixels BP arranged in a second direction (or, a second region symmetrical with the first region) (for example, downward) opposite to the first direction in a target pixel group PG_T.

A neural network NN may include a deep learning model which is trained to correct the first cluster bad pixel CBP1, and thus, when the second input data DTin2 is intactly input to the neural network NN, accurate corrected pixel data PDTc may not be generated.

The bad pixel corrector 20 may vertically flip the second input data DTin2 including the second cluster bad pixel CBP2 to generate third input data DTin3. Therefore, the third input data DTin3 may include a first cluster bad pixel CBP1 in the target pixel group PG_T.

The third input data DTin3 may be input to the neural network NN, and the neural network NN may process the third input data DTin3 to generate corrected pixel data PDTc. Furthermore, the corrected pixel data PDTc may be generated based on the third input data DTin3, and thus, may correspond to the first cluster bad pixel CBP1 of the third input data DTin3.

The bad pixel corrector 20 may vertically flip the corrected pixel data PDTc to generate flipped pixel data PDTf. The flipped pixel data PDTf may correspond to the second cluster bad pixel CBP2. Corrected pixel values included in the flipped pixel data PDTf may be applied as pixel values of the bad pixels BP included in the second cluster bad pixel CBP2.

Figure 9A:
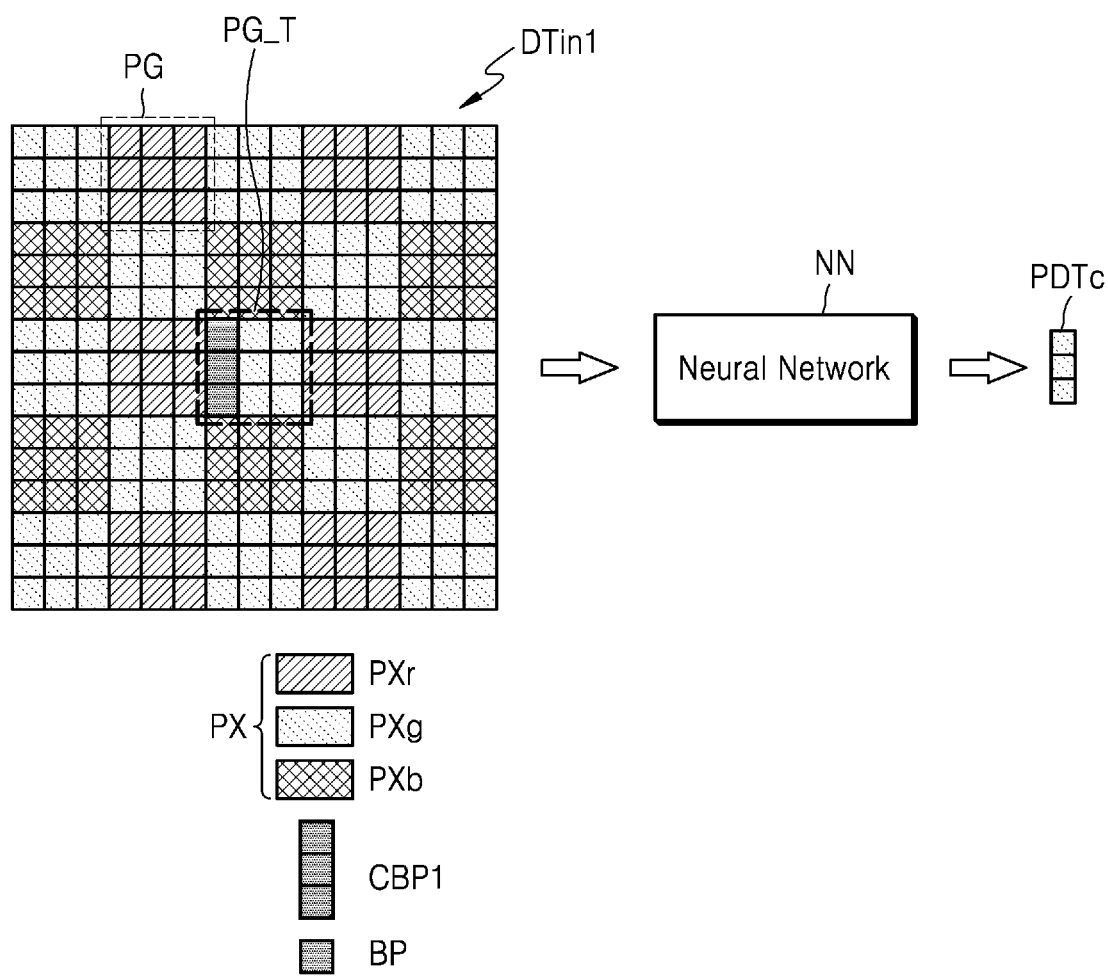

FIGS. 9A and 9B illustrate an operation of a bad pixel corrector according to an embodiment.

Referring to FIGS. 9A and 9B, image data (IDT of FIG. 1) may include a super Bayer pattern, and each of pixel groups PG may include the same color pixels arranged in a 3×3 matrix, and for example, may include red pixels PXr, blue pixels PXb, and green pixels PXg.

Input data (for example, first input data DTin1 and second input data DTin2) may include 25 pixel groups PG arranged in a 5×5 matrix. In other words, the first input data DTin1 and the second input data DTin2 may each include pixels PX arranged in a 15×15 matrix.

Referring to FIG. 9A, a first cluster bad pixel CBP1 may include bad pixels BP arranged in a first direction (or, a first region) (for example, to the left) in a target pixel group PG_T. The first cluster bad pixel CBP1 may include three bad pixels BP arranged in a 3×1 matrix in the target pixel group PG_T.

A neural network NN may include a deep learning model which is trained to correct the first cluster bad pixel CBP1. The first input data DTin1 may be input to the neural network NN, and the neural network NN may process the first input data DTin1 to generate corrected pixel data PDTc.

The corrected pixel data PDTc may include pixel values respectively corresponding to bad pixels BP included in the first cluster bad pixel CBP1. The corrected pixel data PDTc may replace the first cluster bad pixel CBP1 in the target pixel group PG_T.

Referring to FIG. 9B, second input data DTin2 may include a second cluster bad pixel CBP2 including bad pixels BP arranged in a second direction (or, a second region symmetrical with the first region) (for example, to the right) opposite to the first direction in a target pixel group PG_T. The second cluster bad pixel CBP2 may include three bad pixels BP arranged in a 3×1 matrix. The second cluster bad pixel CBP2 may be arranged at a position symmetrical with the first cluster bad pixel CBP1 in the target pixel group PG_T.

The bad pixel corrector 20 may horizontally flip the second input data DTin2 including the second cluster bad pixel CBP2 to generate third input data DTin3. The third input data DTin3 may include a first cluster bad pixel CBP1 in the target pixel group PG_T.

The third input data DTin3 may be input to the neural network NN, and the neural network NN may process the third input data DTin3 to generate corrected pixel data PDTc. The bad pixel corrector 20 may horizontally flip the corrected pixel data PDTc to generate flipped pixel data PDTf. The flipped pixel data PDTf may correspond to the second cluster bad pixel CBP2. Corrected pixel values included in the flipped pixel data PDTf may be applied as pixel values of the bad pixels BP included in the second cluster bad pixel CBP2. It should be understood that the relationship between the first cluster bad pixel and the second cluster bad pixel is not limited to above-described embodiments, and the first cluster bad pixel and the second cluster bad pixel may be arranged in other two directions that may be opposite to or symmetrical with each other (or, other two regions that may be symmetrical with each other with respect to an axis of symmetry) (e.g., an upper left portion and a lower right portion, an upper right portion and a lower left portion, etc.), respectively.

Figure 10:
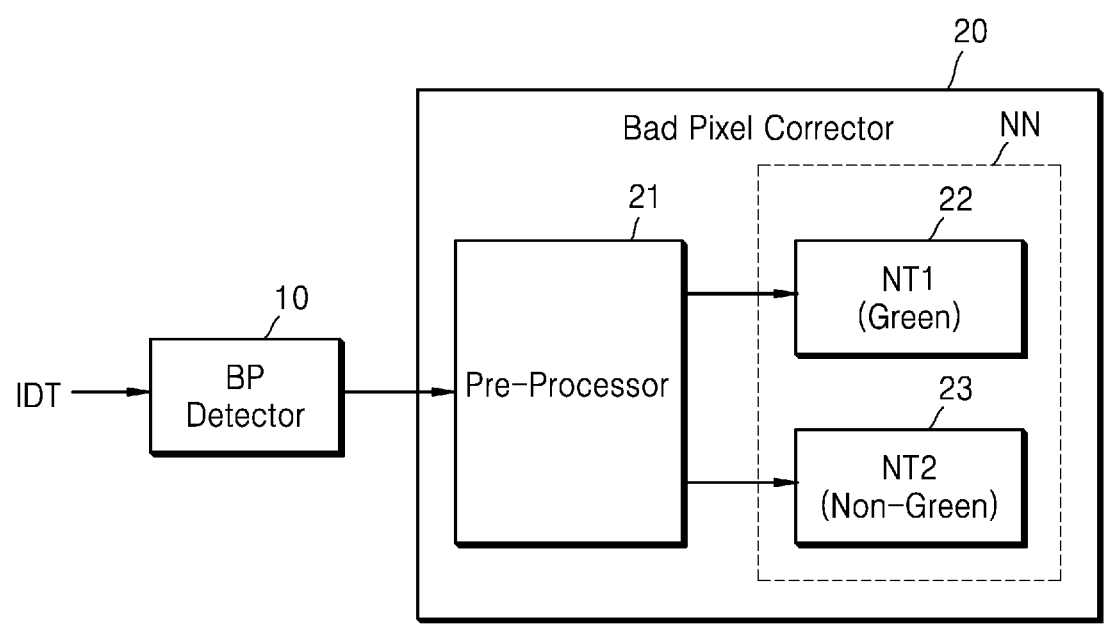
FIG. 10 illustrates a bad pixel corrector according to an embodiment.

FIG. 10 is a block diagram schematically illustrating a bad pixel corrector 20 according to an embodiment. For convenience of description, a bad pixel detector 10 is illustrated together.

Referring to FIG. 10, the bad pixel corrector 20 may include a pre-processor 21 and a neural network NN, and the neural network NN may include a first network NT1 22 and a second network NT2 23. The first network 22 may correspond to a green channel, and the second network 23 may correspond to a non-green channel. For example, the first network 22 may include a deep learning model which is trained based on a case where a first cluster bad pixel occurs in a first green channel (or a second green channel), and the second network 23 may include a deep learning model which is trained based on a case where a first cluster bad pixel occurs in a red channel (or a blue channel).

The pre-processor 21 may generate input data including a cluster bad pixel. As described above, the input data (DTin of FIG. 3) may include a target pixel group including a cluster bad pixel and a peripheral pixel group, and the peripheral pixel group may be arranged at a periphery of the target pixel group.

The pre-processor 21 may flip (for example, horizontally flip or vertically flip) the input data, based on a type of the cluster bad pixel. In an embodiment, the bad pixel detector 10 may detect a bad pixel and a type of the bad pixel in image data IDT and may provide information thereof to the bad pixel corrector 20, and the pre-processor 21 may flip the input data, based on a type of the bad pixel provided from the bad pixel detector 10. For example, in a case where the first network 22 and the second network 23 are trained based on the first cluster bad pixel, when the cluster bad pixel included in the input data is a second cluster bad pixel, the pre-processor 21 may flip (for example, horizontally flip or vertically flip) the input data.

When a cluster bad pixel occurs in the first green channel or the second green channel, the pre-processor 21 may provide the input data or the flipped input data to the first network 22, and when a cluster bad pixel occurs in the blue channel or the red channel, the pre-processor 21 may provide the input data or the flipped input data to the second network 23. The first network 22 or the second network 23 may generate corrected pixel data, based on received input data.

Luminance (or details) of an image may be mainly based on a first green color and a second green color, and a color of the image may be mainly based on a blue color and a red color. Accordingly, a cluster bad pixel occurring in the first green channel and a cluster bad pixel occurring in the second green channel may be corrected by using the first network 22, and a cluster bad pixel occurring in the red channel and a cluster bad pixel occurring in the blue channel may be corrected by using the second network 23.

Figure 11:
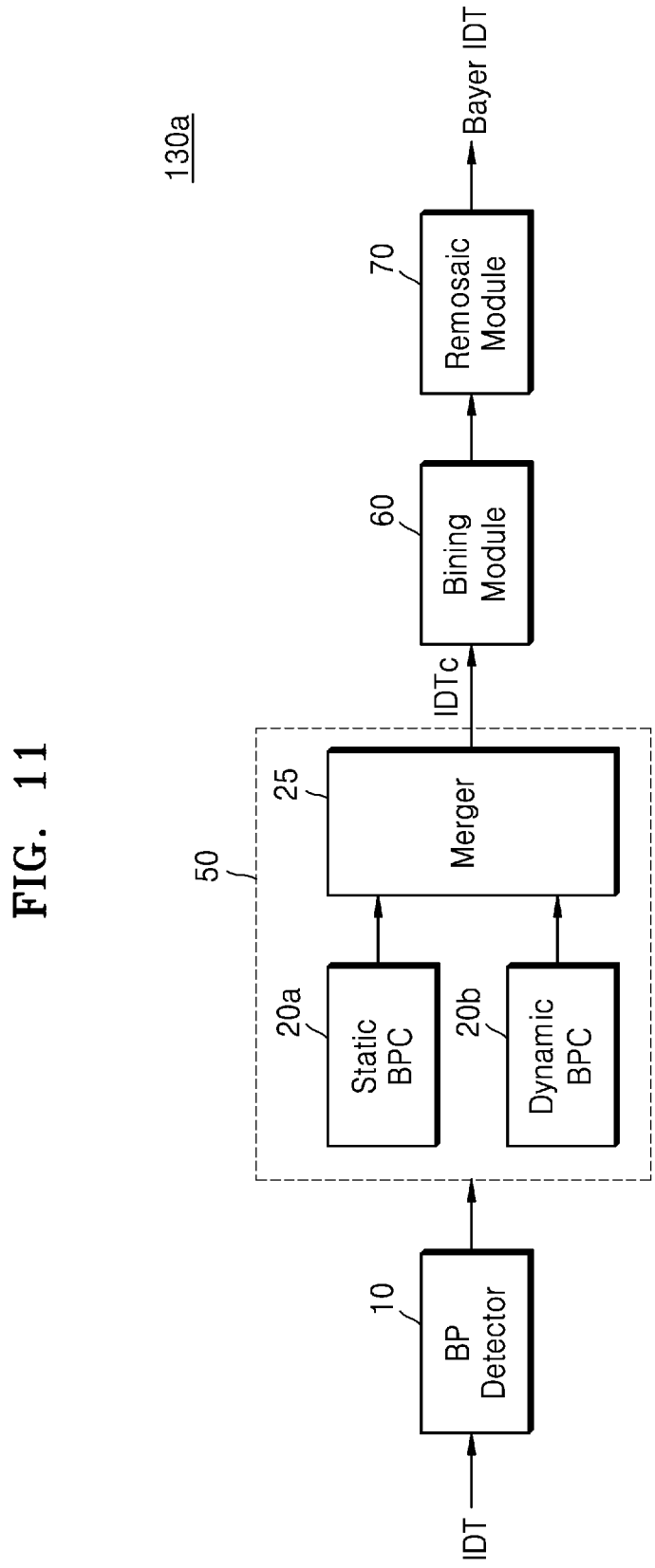
FIG. 11 illustrates an implementation example of an image processor according to an embodiment.

FIG. 11 illustrates an implementation example of an image processor 130a according to an embodiment.

Referring to FIG. 11, the image processor 130a may include a bad pixel detector 10, a correction module 50, a binning module 60, and a remosaic module 70. The correction module 50 may include a static bad pixel corrector 20a, a dynamic bad pixel corrector 20b, and a merger 25.

The bad pixel detector 10 may detect a bad pixel from received image data IDT and may detect a type of the bad pixel, and for example, may detect whether the bad pixel is a static bad pixel, whether the bad pixel is a dynamic bad pixel, or whether the bad pixel includes a first cluster bad pixel or a second cluster bad pixel of static bad pixels. Also, the bad pixel detector 10 may detect a color channel where a static bad pixel occurs. In other words, the bad pixel detector 10 may determine a channel, where the static bad pixel occurs, of a green channel, a blue channel, and a red channel. The bad pixel detector 10 may generate bad pixel information including a color channel and a type of the cluster bad pixel.

When the static bad pixel is detected by the bad pixel detector 10, the image data IDT (or a portion, including the static bad pixel, of image data) may be provided to the static bad pixel corrector 20a (hereinafter referred to as a static BPC). In an embodiment, the bad pixel information generated by the bad pixel detector 10 may be provided to the static bad pixel corrector 20a along with the image data IDT.

The bad pixel corrector 20 described above with reference to FIGS. 1 to 10 may be applied as the static BPC 20a. The static BPC 20a may correct a cluster bad pixel, based on deep learning. In this case, when a first cluster bad pixel occurs, the static BPC 20a may provide input data including the first cluster bad pixel to a neural network to correct the first cluster bad pixel, and when a second cluster bad pixel symmetrical with the first cluster bad pixel occurs, the static BPC 20a may flip input data including the second cluster bad pixel and may input the flipped input data to the neural network to correct the second cluster bad pixel.

In this case, the neural network may include a first network including a deep learning model which is trained to correct a cluster bad pixel occurring in a first green channel (or a second green channel) and a second network including a deep learning model which is trained to correct a cluster bad pixel occurring in a red channel (or a blue channel), and when a cluster bad pixel occurs in the first green channel or the second green channel, input data or flipped input data may be input to the first network. Also, when a cluster bad pixel occurs in the red channel or the blue channel, the input data or the flipped input data may be input to the second network.

When the dynamic bad pixel is detected by the bad pixel detector 10, the image data IDT (or a portion, including the static bad pixel, of image data) may be provided to the dynamic bad pixel corrector 20b (hereinafter referred to as a dynamic BPC). The dynamic BPC 20b may correct a bad pixel which randomly occurs in the image data IDT. In other words, the dynamic BPC 20b may generate pixel data corresponding to the bad pixel.

The merger 25 may merge pieces of image data, received from the static BPC 20a and the dynamic BPC 20b, into one piece of corrected image data. The merger 25 may replace the static bad pixel of the image data IDT with corrected pixel data output from the static BPC 20a and may replace the dynamic bad pixel of the image data IDT with corrected pixel data output from the dynamic BPC 20b. Accordingly, image data where a bad pixel has been corrected may be generated.

In an embodiment, the correction module 50 may further include an element which performs various kinds of corrections. For example, the correction module 50 may further include a denoiser and may remove noise in the image data IDT.

The binning module 60 may bin received image data (for example, corrected image data IDTc) to reduce a resolution of the image data. The binning module 60 may decrease a resolution of the image data input through various schemes.

The remosaic module 70 may change input image data to a Bayer pattern. As described above, the image data IDT output from the readout circuit (120 of FIG. 1) may include a super Bayer pattern. Therefore, image data (for example, corrected image data or image data where resolution has been reduced after correction) received by the remosaic model 70 may include the super Bayer pattern. The remosaic module 70 may perform remosaic processing on input image data including the super Bayer pattern to generate image data including a Bayer pattern. Accordingly, Bayer-pattern image data (Bayer IDT) may be generated. Image processing may be additionally performed on the Bayer-pattern image data (Bayer IDT) or the Bayer-pattern image data (Bayer IDT) may be compressed, and then, image processing-performed Bayer-pattern image data or compressed Bayer-pattern image data may be transferred to an external processor.

In an embodiment, the binning module 60 and/or the remosaic module 70 may be included in the external processor. Accordingly, the corrected image data output from the correction module 50 may be provided to the external processor.

Figure 12:
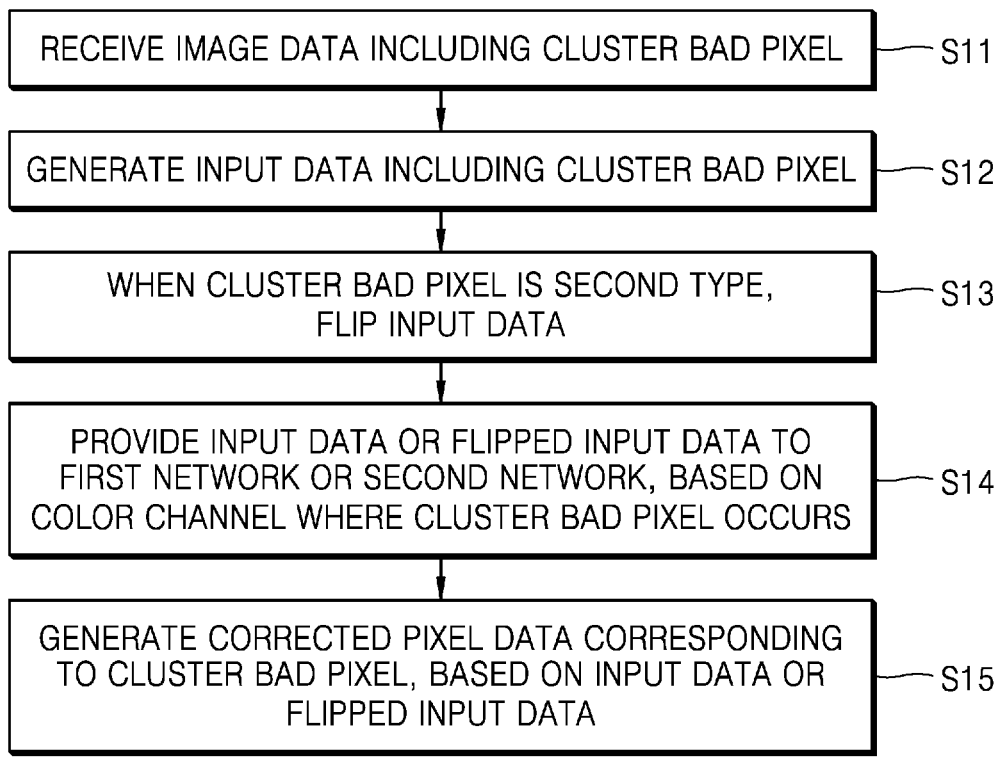
FIG. 12 illustrates an operation of a bad pixel corrector according to an embodiment.

FIG. 12 is a flowchart illustrating an operation of a bad pixel corrector according to an embodiment.

Referring to FIG. 12, the bad pixel corrector (20 of FIGS. 1 and 10) may receive image data (or partial image data) including a cluster bad pixel in operation S11, and may generate input data including a cluster bad pixel in operation S12. For example, when each image data includes a super Bayer pattern based on a pixel group including the same pixels of a 4×4 matrix, the input data may include a pixel group of a 5×5 matrix (for example, pixels of a 20×20 matrix). A target pixel group including a cluster bad pixel may be arranged at a center of the input data.

When the cluster bad pixel is a second type (for example, when the cluster bad pixel is a second cluster bad pixel), the bad pixel corrector 20 may flip the input data in operation S13.

For example, the bad pixel detector 10 (of FIG. 10) may determine a color channel and a type of the cluster bad pixel and may generate bad pixel information based on a result of the determination. The bad pixel corrector 20 may determine whether the cluster bad pixel is a first type (for example, whether the cluster bad pixel is a first cluster bad pixel) or a second type, based on the bad pixel information received from the bad pixel detector 10.

For example, when the first cluster bad pixel includes bad pixels arranged at a left portion in a target pixel group and the second cluster bad pixel includes bad pixels arranged at a right portion in the target pixel group, the input data including the second cluster bad pixel may be horizontally flipped. As another example, when the first cluster bad pixel includes bad pixels arranged at an upper portion in the target pixel group and the second cluster bad pixel includes bad pixels arranged at a lower portion in the target pixel group, the input data including the second cluster bad pixel may be vertically flipped. When the cluster bad pixel is the first type (for example, when the cluster bad pixel is the first cluster bad pixel), the input data may not be flipped.

The bad pixel corrector 20 may input the input data or the flipped input data to the first network 22 (of FIG. 10) or the second network 23 (of FIG. 10), based on a color channel where the cluster bad pixel occurs in operation S14. As described above, the first network 22 may include a deep learning model which is trained to correct a first cluster bad pixel of a first green channel (or a second green channel), and the second network 23 may include a deep learning model which is trained to correct a first cluster bad pixel of a red channel (or a blue channel).

The first network 22 or the second network 23 may generate corrected pixel data corresponding to the cluster bad pixel, based on the input data or the flipped input data in operation S15. The first network 22 may generate corrected pixel data, based on input data or flipped input data where the first cluster bad pixel is included in the first green channel or the second green channel. The second network 23 may generate corrected pixel data, based on input data or flipped input data where the first cluster bad pixel is included in the red channel or the blue channel. Corrected pixel data may replace a cluster bad pixel. In other words, pixel values of corrected pixel data may be respectively applied as pixel values of bad pixels included in a cluster bad pixel. In this case, corrected pixel data generated based on flipped input data may be flipped again, and flipped pixel data may replace a cluster bad pixel.

Figure 13:
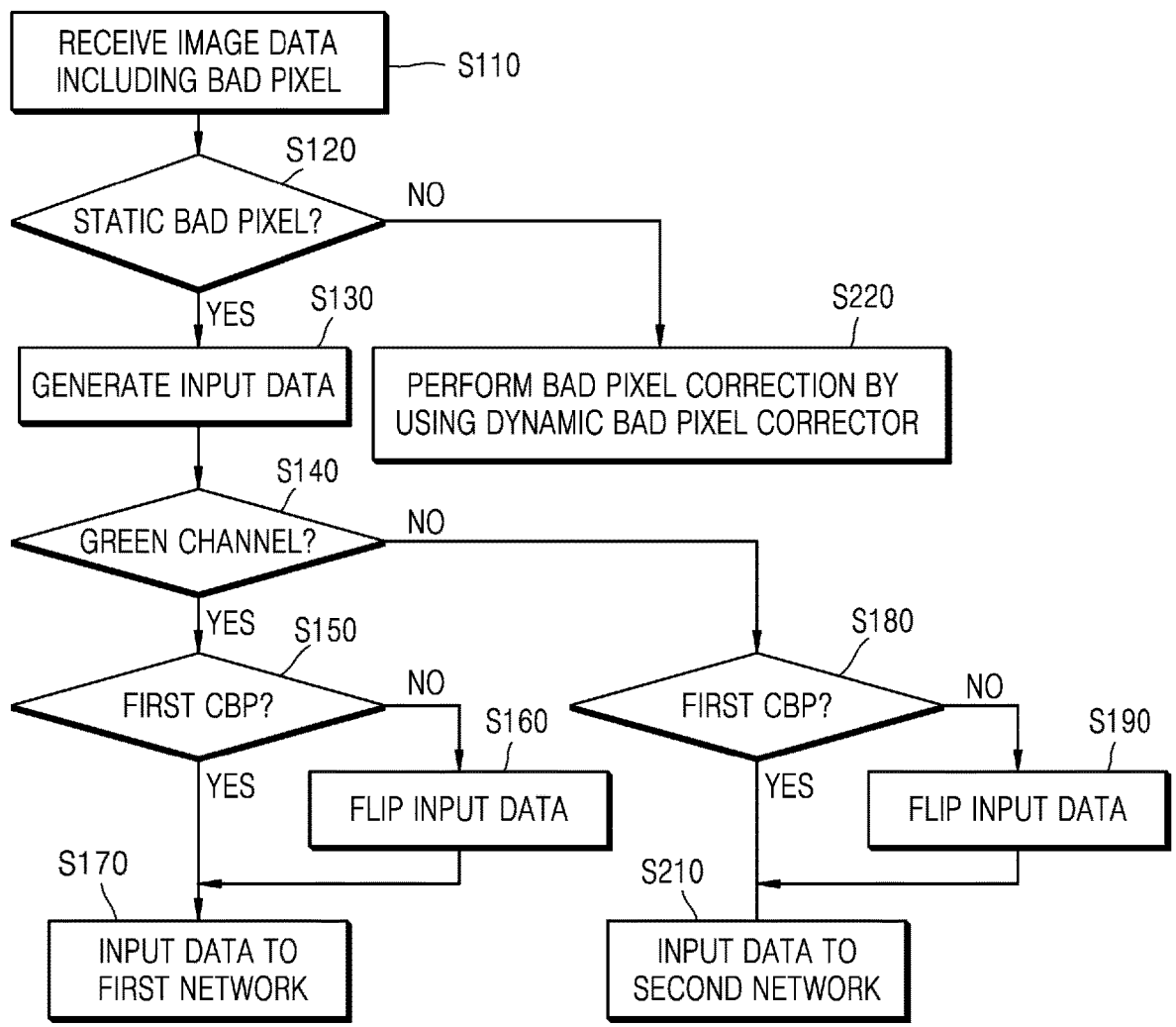
FIG. 13 illustrates an operation of an image sensor according to an embodiment.

FIG. 13 is a flowchart illustrating an operation of an image sensor according to an embodiment. FIG. 13 illustrates an operation of inputting image data including a static bad pixel to a neural network by using the image processor 130*a* of FIG. 11.

Referring to FIG. 13, the bad pixel detector 10 (of FIGS. 1 and 10) may receive image data (or a portion of the image data) including a bad pixel in operation S110. For example, the image data may be received from the readout circuit 120 (of FIG. 1). Alternatively, the image data may be pre-processed by a pre-processing module after the readout circuit 120, and then, may be received.

The bad pixel detector 10 may determine whether the image data includes a static bad pixel (for example, whether the image data includes a cluster bad pixel) in operation S120. When the image data includes the static bad pixel, the image data may be provided to a static BPC 20*a* (of FIG. 10), and when the image data includes a dynamic bad pixel (or a random bad pixel) instead of the static bad pixel, the image data may be provided to a dynamic BPC 20*b* (as shown in FIG. 10). The dynamic BPC 20*b* may perform bad pixel correction on the dynamic bad pixel of the image data in operation S220. Accordingly, image data or partial image data, where the dynamic bad pixel has been corrected, may be generated.

The static BPC 20*a* (for example, a deep learning-based BPC) may generate input data including a cluster bad pixel in operation S130. The input data may include a plurality of pixel groups, and a target pixel group including a cluster bad pixel may be arranged at a center of the input data.

In operation S140, the static BPC 20*a* may determine whether a cluster bad pixel occurs in a green channel. When the cluster bad pixel occurs in the green channel (a first green channel or a second green channel), the static BPC 20*a* may determine whether the cluster bad pixel occurring in the green channel is a first cluster bad pixel in operation S150. For example, the static BPC 20*a* may determine whether the cluster bad pixel occurs in the green channel and is the first cluster bad pixel, based on bad pixel information which is received from the bad pixel detector 10 along with the image data (or the partial image data).

When the cluster bad pixel is the first cluster bad pixel (for example, when the image data (or the input data) includes the first cluster bad pixel, the static BPC 20*a* may input the input data to the first network 22 (of FIG. 10) in operation S170.

When the cluster bad pixel is not the first cluster bad pixel (for example, when the image data (or the input data) includes a second cluster bad pixel, the static BPC 20*a* may flip the input data in operation S160, and may input the flipped input data to the first network 22 in operation S170. For example, when the first cluster bad pixel and the second cluster bad pixel are horizontally symmetrical with each other, the second cluster bad pixel may be horizontally flipped. As another example, when the first cluster bad pixel and the second cluster bad pixel are vertically symmetrical with each other, the second cluster bad pixel may be vertically flipped.

The first network 22 may include a deep learning model which is trained to correct the first cluster bad pixel of the first green channel (or the second green channel). The first network 22 may generate corrected pixel data, based on input data or flipped input data where the first cluster bad pixel is included in the first green channel or the second green channel.

When the cluster bad pixel occurs in a non-green channel (a red channel or a blue channel) instead of the green channel, the static BPC 20a may determine whether the cluster bad pixel occurring in the non-green channel is the first cluster bad pixel in operation S180. When the cluster bad pixel is the first cluster bad pixel (for example, when the image data (or the input data) includes the first cluster bad pixel, the static BPC 20a may input the input data to the second network 23 (of FIG. 10) in operation S210.

When the cluster bad pixel is not the first cluster bad pixel (for example, when the image data (or the input data) includes the second cluster bad pixel, the static BPC 20a may flip the input data in operation S190 and may input the flipped input data to the second network 23 in operation S210.

The second network 23 may include a deep learning model which is trained to correct the first cluster bad pixel of the red channel (or the blue channel). The second network 23 may generate corrected pixel data, based on input data or flipped input data where the first cluster bad pixel is included in the red channel or the blue channel.

Furthermore, the order of an operation S140 of determining whether the cluster bad pixel occurs in the green channel and operations S150 and S180 of determining whether the cluster bad pixel is the first cluster bad pixel may be changed. For example, after an operation of determining whether the cluster bad pixel is the first cluster bad pixel is performed, an operation of determining whether the cluster bad pixel occurs in the green channel may be performed. Alternatively, an operation S140 of determining whether the cluster bad pixel occurs in the green channel and operations S150 and S180 of determining whether the cluster bad pixel is the first cluster bad pixel may be performed simultaneously.

Figure 14:
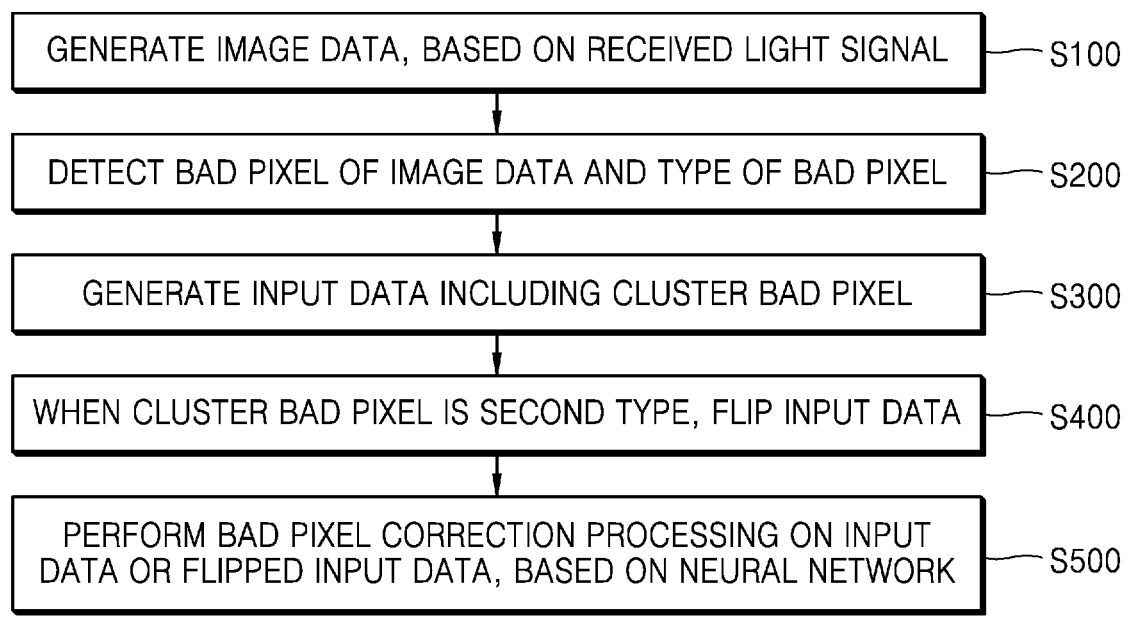
FIG. 14 illustrates an operation of an image sensor according to an embodiment.

FIG. 14 is a flowchart illustrating an operating method of an image sensor, according to an embodiment. The operating method of FIG. 14 may be performed by the image sensor 100 of FIG. 1, and descriptions given above with reference to FIGS. 1 to 13 may be applied to an embodiment.

Referring to FIG. 14, the image sensor 100 may generate image data, based on a received light signal in operation S100. The readout circuit 120 may convert the received light signal into a plurality of electrical signals and may provide the plurality of electrical signals to the readout circuit 120, and the readout circuit 120 may generate image data, based on the plurality of electrical signals.

The image sensor 100 may detect a bad pixel of image data and a type of the bad pixel in operation S200. For example, the bad pixel detector 10 may detect the bad pixel of the image data and may determine whether the bad pixel includes a static bad pixel (for example, whether the bad pixel includes a cluster bad pixel or whether the bad pixel includes a dynamic bad pixel), and when the bad pixel includes the cluster bad pixel, the bad pixel detector 10 may determine whether the cluster bad pixel includes a first cluster bad pixel or whether the cluster bad pixel includes a second cluster bad pixel. Also, the bad pixel detector 10 may determine a color channel where a static bad pixel occurs. The bad pixel detector 10 may generate bad pixel information based on a result of the determination.

When the image data includes a cluster bad pixel, the image sensor 100 may generate input data including the cluster bad pixel in operation S300. For example, the image data (or a portion of the image data) including the cluster bad pixel may be provided to the bad pixel corrector 20, and the bad pixel corrector 20 may generate the input data including a target pixel group including the cluster bad pixel and a peripheral pixel group.

When the cluster bad pixel is a second type (for example, when the cluster bad pixel is a second cluster bad pixel), the image sensor 100 may flip the input data in operation S400. Positions and shapes of the first cluster bad pixel and the second cluster bad pixel may be symmetrical with each other. For example, the first cluster bad pixel may include pixels arranged at a left portion in the target pixel group, and the second cluster bad pixel may include pixels arranged at a right portion in the target pixel group. Alternatively, the first cluster bad pixel may include pixels arranged at an upper portion in the target pixel group, and the second cluster bad pixel may include pixels arranged at a lower portion in the target pixel group. When the cluster bad pixel is a first type (for example, when the cluster bad pixel is a first cluster bad pixel), the image sensor 100 may not flip the input data.

In operation S500, the image sensor 100 may perform bad pixel correction processing on the input data or the flipped input data, based on a neural network. The neural network may include a deep learning model which is trained to perform bad pixel correction processing on the first cluster bad pixel. Accordingly, when the input data includes the first cluster bad pixel, the input data may be input to the neural network, and when the input data includes the second cluster bad pixel, the input data may be flipped (horizontally flipped or vertically flipped) and the flipped input data may be input to the neural network. The neural network may perform bad pixel correction processing on the input data or the flipped input data. The neural network may generate corrected pixel data corresponding to the cluster bad pixel.

In an embodiment, as described above with reference to operation S14 and operation S15 of FIG. 12, the neural network may include a first network (22 of FIG. 10) corresponding to a green channel and a second network (23 of FIG. 10) corresponding to a non-green channel, the input data or the flipped input data may be input to the first network or the second network, based on a color channel where a cluster bad pixel occurs, and the first network or the second network may perform bad pixel correction processing on the input data or the flipped input data.

Figure 15:
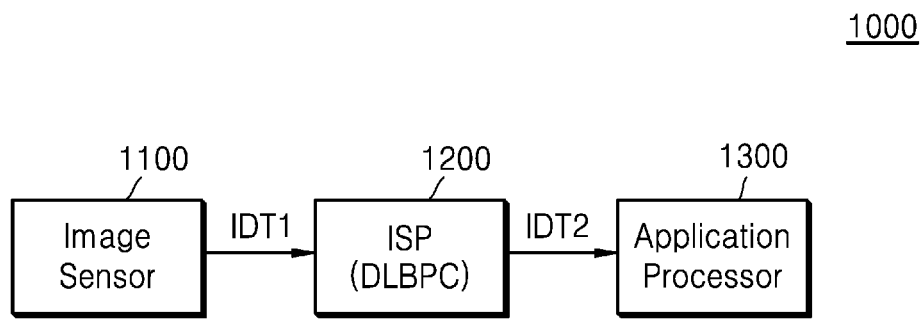
FIG. 15 illustrates an image processing device according to an embodiment.

FIG. 15 is a block diagram schematically illustrating an image processing device 1000 according to an embodiment.

Referring to FIG. 15, the image processing device 1000 (or an imaging device) may include an image sensor 1100, an image signal processor (ISP) 1200, and an application processor 1300. The image processing device 1000 may include a pixel array and a readout circuit and may output original image data as first image data IDT1.

The bad pixel detector 10 and the bad pixel corrector 20 each described above with reference to FIGS. 1 to 14 may be applied to the image signal processor 1200. The image signal processor 1200 may perform deep learning-based bad pixel correction on the first image data IDT1 to generate second image data IDT2 where a cluster bad pixel has been corrected.

The image signal processor 1200 may include a first network based on deep learning corresponding to a first cluster bad pixel of a green channel and a second network based on deep learning corresponding to a first cluster bad pixel of a non-green channel and may process input data or flipped input data including a cluster bad pixel by using the first network or the second network, based on a color channel where a cluster bad pixel occurs and a type of the cluster bad pixel (for example, whether the cluster bad pixel is a first cluster bad pixel or a second cluster bad pixel), thereby correcting the cluster bad pixel. The bad pixel detector 10 and the bad pixel corrector 20 have been described above in detail, and thus, more detailed descriptions thereof may be omitted.

The application processor 1300 may perform an additional operation, based on the second image data IDT2 received thereby. In an embodiment, the application processor 1300 may include an image processing circuit for performing image processing of a level which is higher than the image signal processor 1200, and the image processing circuit may perform image processing on the second image data IDT2. For example, the image processing circuit may change a data format of the second image data IDT2, or may adjust sharpness, contrast, or a size of the second image data IDT2. As another example, the image processing circuit may perform high dynamic range (HDR) processing on a plurality of second image data IDT2 having different luminance to generate an HDR image where a dynamic range has increased.

Figure 16:
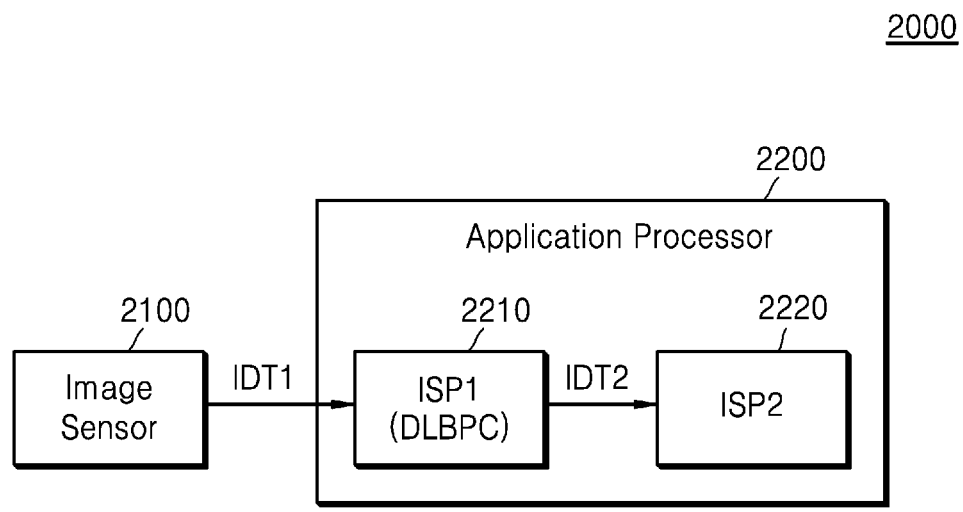
FIG. 16 illustrates an image processing device according to an embodiment.

FIG. 16 is a block diagram schematically illustrating an image processing device 2000 according to an embodiment.

Referring to FIG. 16, the image processing device 2000 may include an image sensor 2100 and an application processor 2200. The application processor 2200 may include a first image signal processor (ISP1) 2210 and a second image signal processor (ISP2) 2220.

The first image signal processor 2210 may receive first image data IDT1 from the image sensor 2100 and may perform image processing such as bad pixel correction and noise removal on the first image data IDT1. The bad pixel detector 10 and the bad pixel corrector 20 each described above with reference to FIGS. 1 to 14 may be applied to the first image signal processor 2210. The first image signal processor 2210 may receive the first image data IDT1 from the image sensor 2100 and may perform deep learning-based bad pixel correction on the first image data IDT1 to generate second image data IDT2 where a cluster bad pixel has been corrected.

The image signal processor 1200 may include a first network based on deep learning corresponding to a first cluster bad pixel of a green channel and a second network based on deep learning corresponding to a first cluster bad pixel of a non-green channel and may process input data or flipped input data including a cluster bad pixel by using the first network or the second network, based on a color channel where a cluster bad pixel occurs and a type of the cluster bad pixel (for example, whether the cluster bad pixel is a first cluster bad pixel or a second cluster bad pixel), thereby correcting the cluster bad pixel.

The second image signal processor 2220 may perform image processing of a level which is higher than the first image signal processor 2210. For example, the second image signal processor 2220 may perform image processing, such as color coordinate change, brightness adjustment, sharpness adjustment, contrast adjustment, and HDR processing, on the second image data IDT2.

Figure 17:
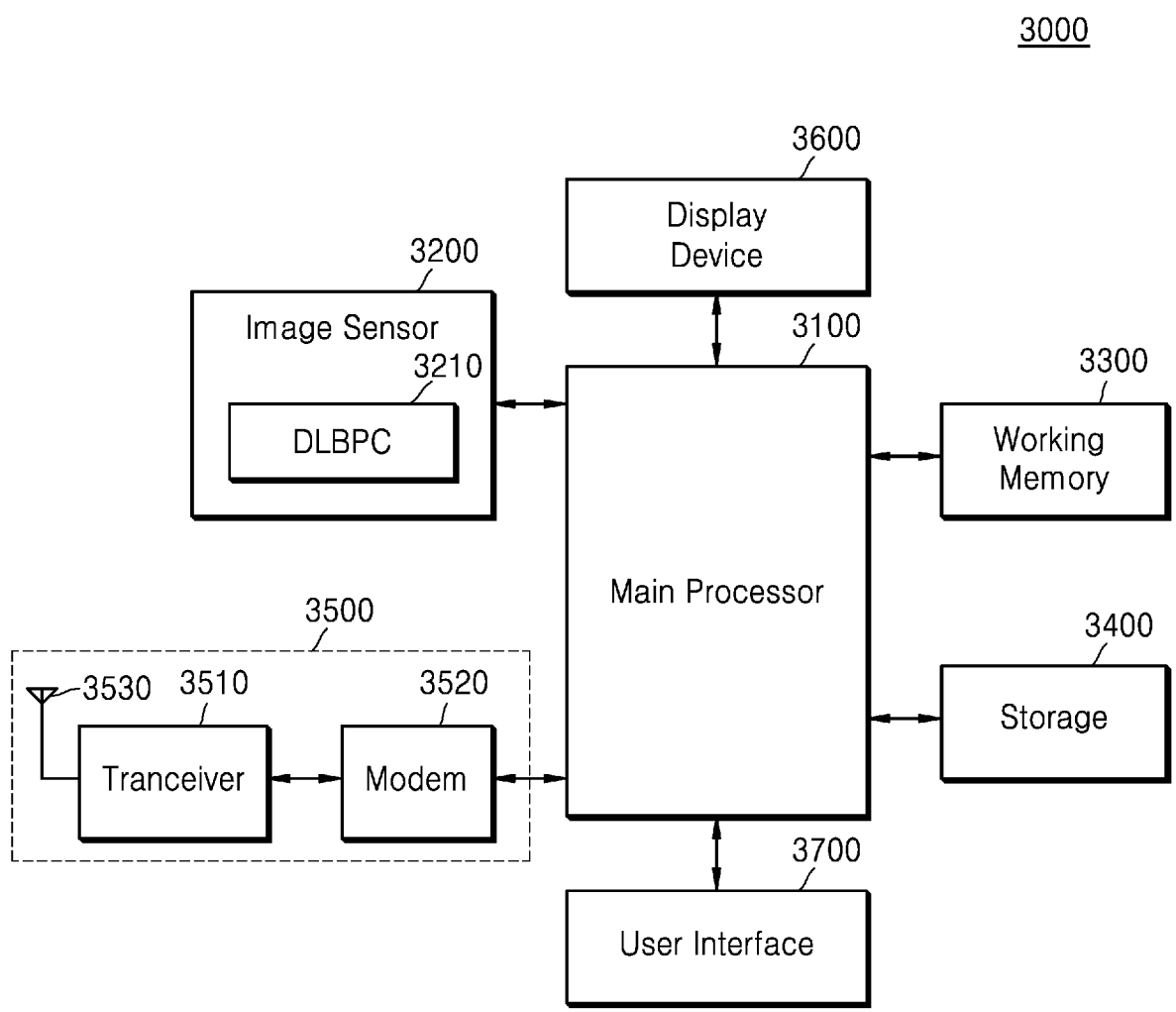
FIG. 17 illustrates an electronic device including an image sensor, according to an embodiment.

FIG. 17 is a block diagram illustrating an electronic device 3000 including an image sensor, according to an embodiment. The electronic device 3000 of FIG. 17 may be a portable terminal.

Referring to FIG. 17, the electronic device 3000 may include a main processor 3100, an image sensor 3200, a display device 3600, a working memory 3300, a storage 3400, a user interface 3700, and a wireless transceiver 3500.

The main processor 3100 may control an overall operation of the electronic device 3000 and may be implemented as a system on chip (SoC) which drives an application program and an operating system (OS). The main processor 3100 may provide the display device 3600 with image data provided from the image sensor 3200, or may store the image data in the storage 3400. In an embodiment, the main processor 3100 may include an image processing circuit and may perform image processing, such as image quality adjustment and data format change, on the image data received from the image sensor 3200.

The image sensor 100 described above with reference to FIGS. 1 to 14 may be applied as the image sensor 3200. The image sensor 3200 may include a bad pixel corrector (DLBPC) 3210. In one embodiment, the DLBPC 3210 may be deep learning-based.

The bad pixel corrector 3210 may perform deep learning-based bad pixel correction on a cluster bad pixel which occurs at a fixed position of the image data. The bad pixel corrector 3210 may include a neural network which is weight-lightened and may provide input data including the cluster bad pixel to the neural network or may flip the input data and may input the flipped input data to the neural network, thereby correcting the cluster bad pixel in real time.

The working memory 3300 may be implemented as a volatile memory, such as dynamic random access memory (RAM) (DRAM) or static RAM (SRAM), or a non-volatile resistive memory such as ferroelectric RAM (FeRAM), resistive RAM (RRAM), or phase-change RAM (PRAM). The working memory 3300 may store programs and/or data, which are/is processed or executed by the main processor 3100.

The storage 3400 may be implemented as a non-volatile memory device such as NAND flash memory or resistive memory, and for example, may be provided as a memory card such as multi-media card (MMC), embedded MMC (eMMC), secure digital (SD) card, or micro SD card. The storage 3400 may store the image data provided from the image sensor 3200.

The user interface 3700 may be implemented with various devices, such as a keyboard, a curtain key panel, a touch panel, a fingerprint sensor, and a microphone, for receiving a user input. The user interface 3700 may receive the user input and may provide the main processor 3100 with a signal corresponding to the received user input.

The wireless transceiver 3500 may include a transceiver 3510, a modem 3520, and an antenna 3530. The wireless transceiver 3500 may receive or transmit data through wireless communication with an external device.

Hereinabove, exemplary embodiments have been described in the drawings and the specification. Embodiments have been described by using the terms described herein, but this has been merely used for describing the disclosure and has not been used for limiting a meaning or limiting the scope of the disclosure defined in the following claims. Therefore, it may be understood by those of ordinary skill in the art that various modifications and other equivalent embodiments may be implemented from the disclosure.

While the disclosure has been particularly shown and described with reference to embodiments thereof, it will be understood that various changes in form and details may be made therein without departing from the spirit and scope of the following claims.

What is claimed is:

1. An image sensor comprising:
   a pixel array comprising a plurality of sensing pixels each configured to convert a received light signal into an electrical signal;
   a readout circuit configured to convert the electrical signals into image data and output the image data; and
   a bad pixel correction circuit configured to:
      input, to a neural network, first input data comprising a first cluster bad pixel of the image data in a first direction to generate a first corrected pixel data, and
      flip second input data comprising a second cluster bad pixel of the image data in a second direction to generate third input data, and input, to the neural network, the third input data to generate a second corrected pixel data.

2. The image sensor of claim 1, wherein the image data comprises a color pattern comprising four pixel groups comprising pixels of same color arranged in an N×N matrix,
   wherein N is an integer of 2 or more,
   wherein the first cluster bad pixel comprises pixels arranged in the first direction in a target pixel group comprising the first cluster bad pixel, and
   wherein the second cluster bad pixel comprises pixels arranged in the second direction opposite to the first direction in the target pixel group.

3. The image sensor of claim 2, wherein each of the first input data, the second input data, and the third input data comprises pixel groups arranged in a 5×5 matrix, and
   wherein the target pixel group is provided at a center of the 5×5 matrix.

4. The image sensor of claim 2, wherein each of the first cluster bad pixel and the second cluster bad pixel comprises pixels arranged in an M×K matrix,
   wherein M is an integer of 2 or more and less than N,
   wherein K is an integer of 1 or more and N or less, and
   wherein the M×K matrix is arranged at a symmetrical position in the target pixel group.

5. The image sensor of claim 4, wherein the first corrected pixel data comprises pixel values respectively corresponding to pixels of a first M×K matrix corresponding to the first cluster bad pixel, and
   wherein the second corrected pixel data comprises pixel values respectively corresponding to pixels of a second M×K matrix corresponding to the second cluster bad pixel.

6. The image sensor of claim 1, further comprising a bad pixel detection circuit configured to detect a bad pixel of the image data, a type of the bad pixel, and a color channel comprising the bad pixel.

7. The image sensor of claim 6, wherein the neural network comprises:
   a first network corresponding to a green color; and
   a second network corresponding to a non-green color,
   wherein the neural network is trained to correct a cluster bad pixel in the first direction, and
   wherein the bad pixel correction circuit is further configured to:
      in a first case that the first cluster bad pixel or the second cluster bad pixel occurs in a green channel comprising a plurality of green pixel groups, input the first input data or the third input data to the first network and,
      in a second case that the first cluster bad pixel or the second cluster bad pixel occurs in a red channel comprising a plurality of red pixel groups or in a blue channel comprising a plurality of blue pixel groups, input the first input data or the third input data to the second network.

8. The image sensor of claim 7, wherein the first network is trained based on first training image data comprising the first cluster bad pixel in the green channel, and
   wherein the second network is trained based on second training image data comprising the first cluster bad pixel in one of the red channel and the blue channel.

9. The image sensor of claim 1, wherein the neural network comprises at least one of a convolution layer, a max pooling layer, and a fully connected layer.

10. The image sensor of claim 1, wherein the bad pixel correction circuit is further configured to horizontally flip the second corrected pixel data generated based on the third input data and replace pixel data, corresponding to the second cluster bad pixel in the image data, with flipped pixel data.

11. An image sensor comprising:
    a pixel array comprising a plurality of pixels each configured to convert a received light signal into an electrical signal;
    a readout circuit configured to convert the electrical signals into image data and output the image data, the image data each comprising a plurality of pixel groups each comprising pixels of same color arranged in an N×N matrix; and
    an image signal processor configured to:
       generate input data comprising a target pixel group comprising a cluster bad pixel,
       input the input data to a neural network in a first case that the cluster bad pixel is arranged at a left portion in the target pixel group,
       flip the input data horizontally in a second case that the cluster bad pixel is arranged at a right portion in the target pixel group, and input the flipped input data to the neural network,
    wherein N is an integer of 2 or more.

12. The image sensor of claim 11, wherein the image signal processor comprises:
    a bad pixel detector configured to detect a bad pixel and a type of the bad pixel in the image data; and
    a bad pixel correction circuit configured to input the input data or the flipped input data to the neural network to generate corrected pixel data corresponding to the cluster bad pixel, based on information about the type of the bad pixel,
    wherein the bad pixel correction circuit comprises the neural network.

13. The image sensor of claim 11, wherein the neural network is configured to be trained to correct a cluster bad pixel arranged at the left portion in the target pixel group.

14. The image sensor of claim 11, wherein the neural network comprises a first network corresponding to a green color channel and a second network corresponding to a non-green color channel, and
    wherein the neural network is configured to:
       in a third case that the cluster bad pixel occurs in the green color channel, input the input data or the flipped input data to the first network and, in a fourth case that the cluster bad pixel occurs in a red channel or a blue channel, input the input data or the flipped input data to the second network.

15. The image sensor of claim 11, wherein the cluster bad pixel comprises pixels arranged in an M×K matrix,
wherein M is an integer of 2 or more and less than N, and
wherein K is an integer of 1 or more and N or less.

16. A method performed by an image sensor, the method comprising:
generating image data, based on a light signal received by the image sensor;
detecting a cluster bad pixel in the image data;
generating input data comprising a target pixel group comprising the cluster bad pixel and peripheral pixel groups arranged at a periphery of the target pixel group;
in a case that the cluster bad pixel comprises a second cluster bad pixel comprising pixels arranged in a second direction in the target pixel group, flipping the input data to generate flipped input data; and
performing bad pixel correction processing on the input data or the flipped input data, based on a neural network trained to correct a first cluster bad pixel symmetrical with the second cluster bad pixel.

17. The method of claim 16, wherein the neural network comprises a first network corresponding to a green channel and a second network corresponding to a non-green channel, and
wherein the input data or the flipped input data is input to the first network or the second network, based on a color channel comprising the cluster bad pixel.

18. The method of claim 17, wherein the first network is trained to correct the cluster bad pixel, based on training image data comprising a cluster bad pixel of the green channel, and
wherein the second network is trained to correct the cluster bad pixel, based on training image data comprising a cluster bad pixel of one of a red channel and a blue channel.

19. The method of claim 16, wherein the first cluster bad pixel comprises bad pixels arranged at a left portion in the target pixel group,
wherein the second cluster bad pixel comprises bad pixels arranged at a right portion in the target pixel group, and
wherein a type of the first cluster bad pixel is symmetrical with a type of the second cluster bad pixel.

20. The method of claim 16, wherein the target pixel group comprises pixels of the same color arranged in an N×N matrix,
wherein N is an integer of 2 or more,
wherein the input data comprises pixels arranged in a 5N×5N matrix, and
wherein the target pixel group is arranged at a center of the input data.

* * * * *